United States Patent [19]
Ishii et al.

[11] Patent Number: 5,960,077
[45] Date of Patent: Sep. 28, 1999

[54] ECHO CANCELLER

[75] Inventors: Tomoko Ishii; Shigeaki Suzuki; Nobuyoshi Horie, all of Tokyo, Japan

[73] Assignee: Mitsubishi Denki Kabushiki Kaisha, Tokyo, Japan

[21] Appl. No.: 08/823,760

[22] Filed: Mar. 25, 1997

[30] Foreign Application Priority Data

Mar. 28, 1996 [JP] Japan .................................. 8-074655

[51] Int. Cl.⁶ .................................................. H04M 1/00
[52] U.S. Cl. ........................... 379/410; 379/411; 379/406
[58] Field of Search .................................. 379/410, 406, 379/411, 391; 370/286, 289, 290, 291

[56] References Cited

U.S. PATENT DOCUMENTS

| | | | |
|---|---|---|---|
| 3,894,200 | 7/1975 | Campenella et al. | 379/406 |
| 4,894,820 | 1/1990 | Miyamoto et al. | 370/289 |
| 4,918,727 | 4/1990 | Bohrs et al. | 370/289 |
| 5,371,789 | 12/1994 | Hirano | 379/410 |
| 5,396,554 | 3/1995 | Hirano et al. | 379/410 |
| 5,483,594 | 1/1996 | Prado et al. | 379/410 |
| 5,513,265 | 4/1996 | Hirano | 381/66 |

FOREIGN PATENT DOCUMENTS

| | | |
|---|---|---|
| 287861 | 3/1990 | Japan . |
| 2305231 | 12/1990 | Japan . |
| 4284732 | 10/1992 | Japan . |
| 4331512 | 11/1992 | Japan . |
| 2202717 | 9/1988 | United Kingdom . |

*Primary Examiner*—Ahmad F. Matar
*Assistant Examiner*—Charles N. Appiah

[57] ABSTRACT

A counter increments a count value every given time period. An adaptive operation control unit selects channels in which adaptive operations are done from all the channels in obedience to the count value to output produced selection signals to AND circuits. Double-talk detection circuits judge the presence/absence of a double-talk state and output detection signals to the AND circuits. The AND circuits operate logical AND of the selection signals and the detection signals and output the logical AND results as control signals to filter coefficient updating circuits. The filter coefficient updating circuits update or do not update filter coefficients stored in FIR filter units according to the control signals. The FIR filter units produce echo replicas by calculating convolutions of the filter coefficients and the receive signals. Subtractors subtract the echo replicas from transmission signals to output residual signals.

21 Claims, 32 Drawing Sheets

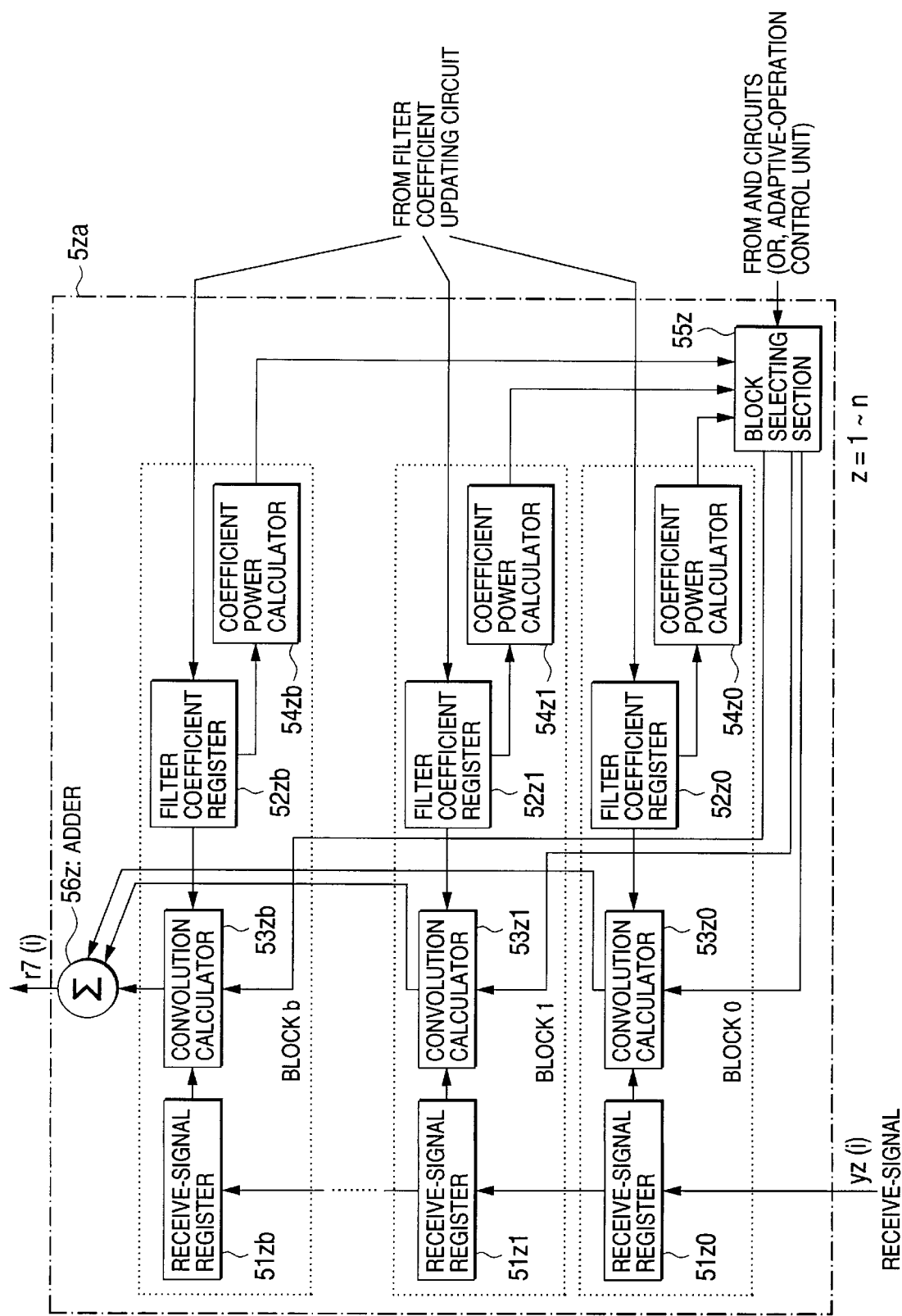

FIG. 30 "PRIOR ART"
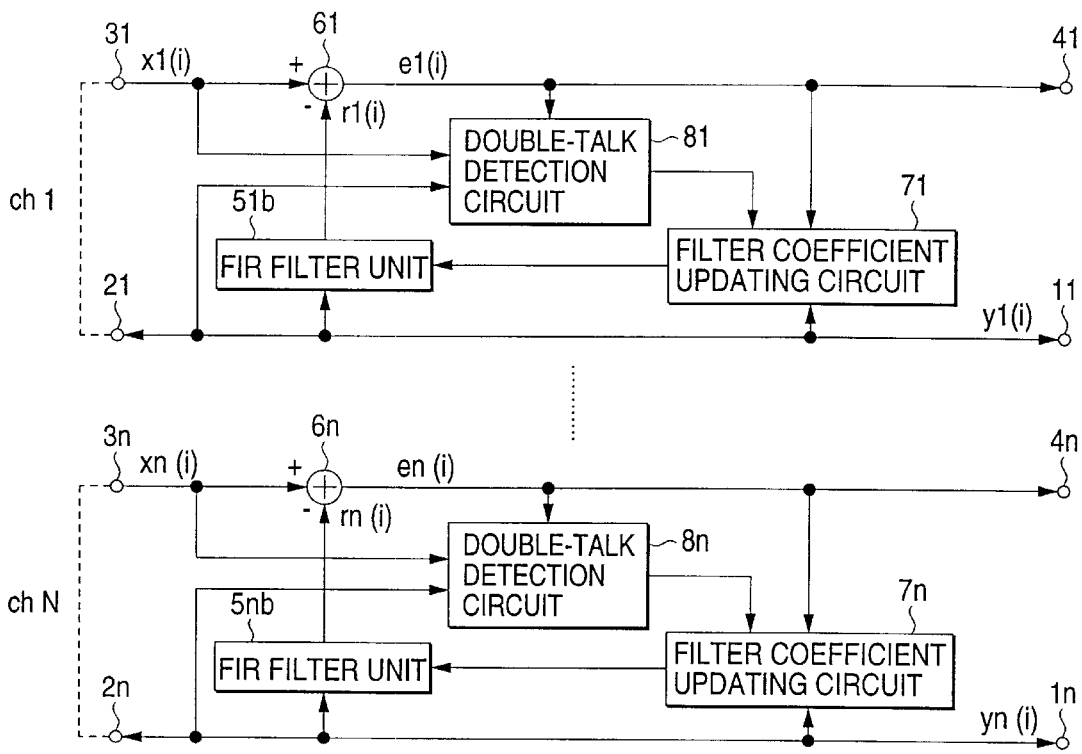
FIG. 31 "PRIOR ART"
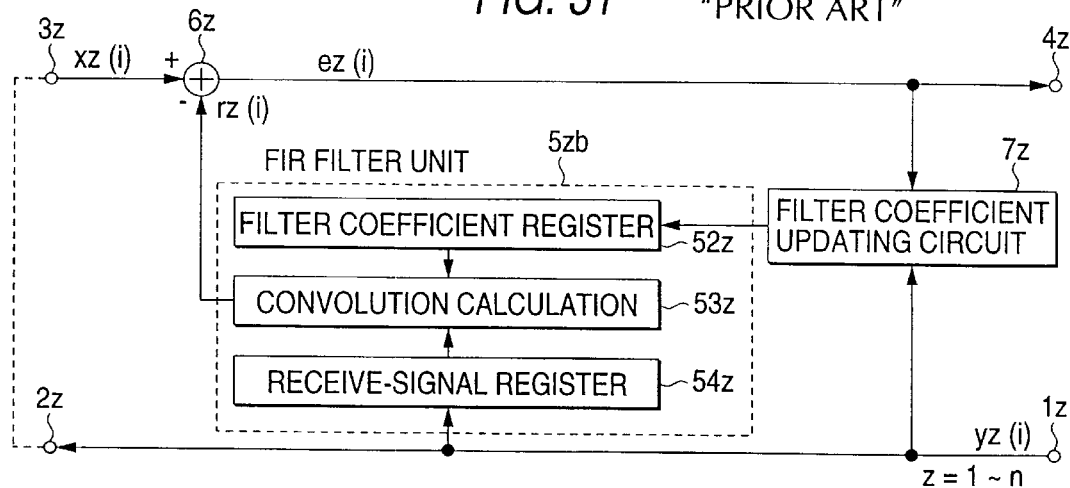

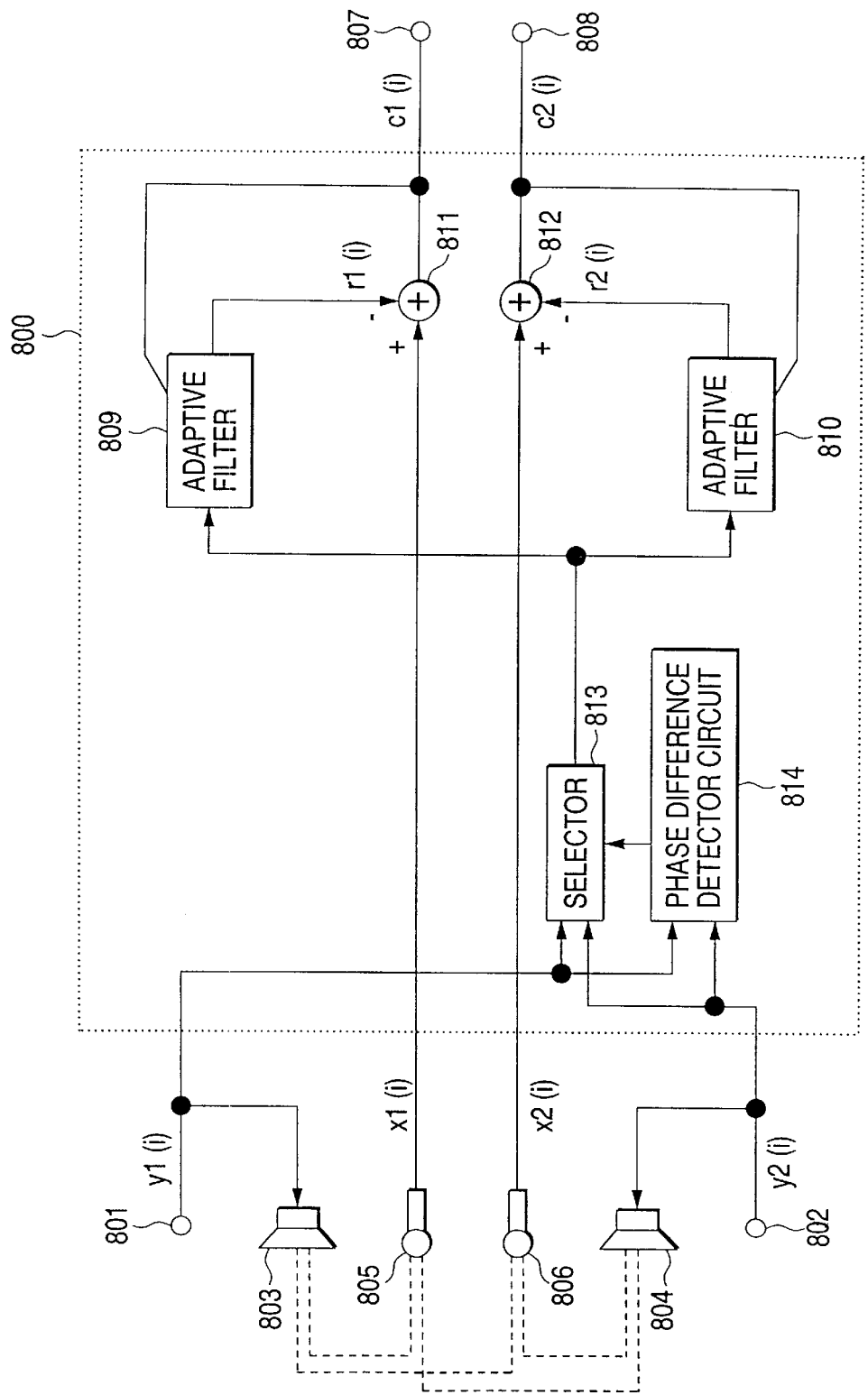
FIG. 32 "PRIOR ART"

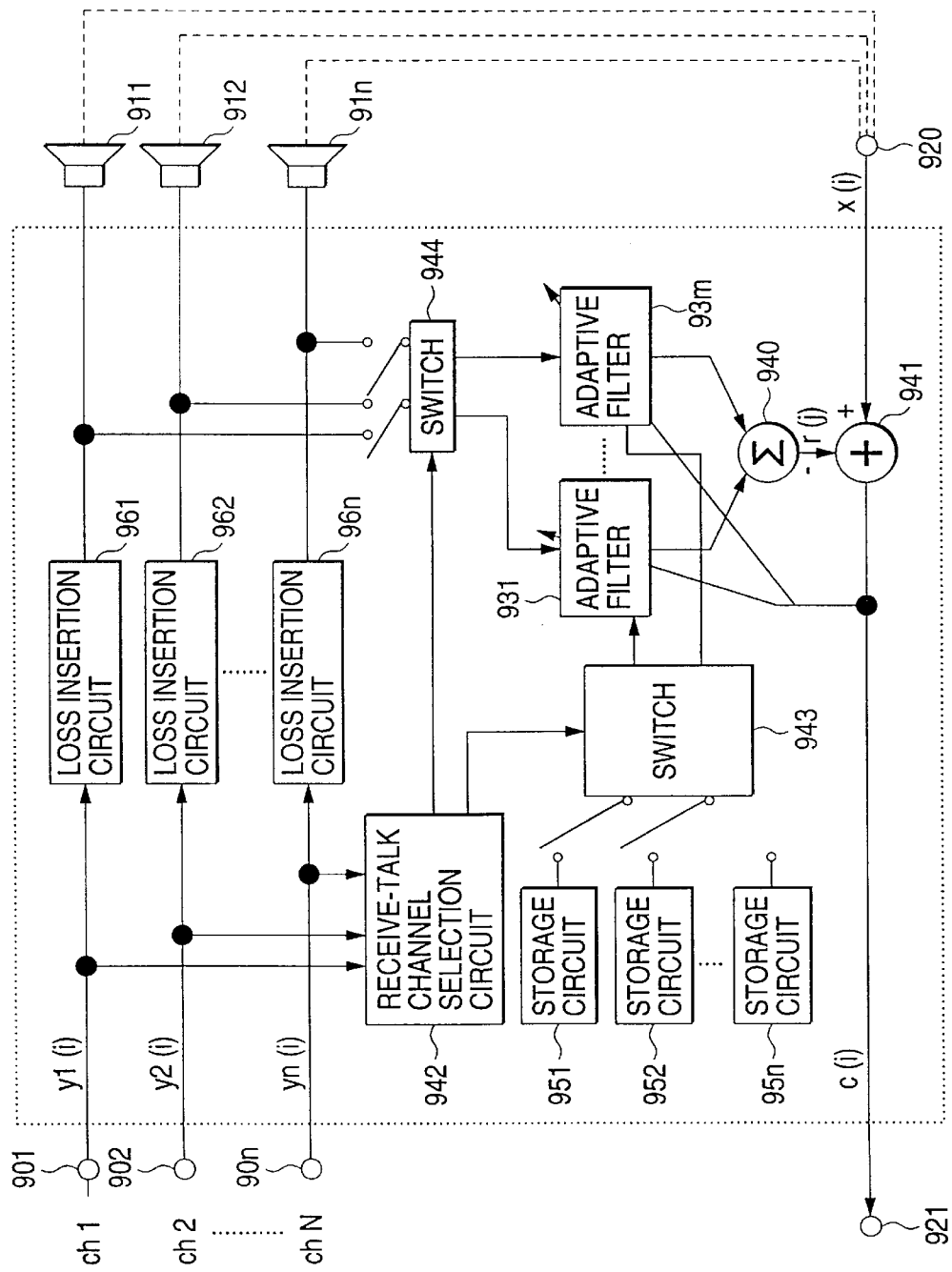
FIG. 33 "PRIOR ART"

5,960,077

ECHO CANCELLER

BACKGROUND OF THE INVENTION

1. Field of the Invention

The present invention relates to an echo canceller for multi-channel processing which cancels echoes contained in transmission signals by subtracting echo replicas which are convolutions of estimated impulse responses of echo paths with receive signals.

2. Description of the Related Art

For example, a conventional multi-channel echo canceller having a plurality of single-channel echo cancellers which is disclosed in Japanese Patent Unexamined Publication No. Hei 4-331512, as shown in FIG. 30, includes receive signal input/output terminals 11 to 1n/21 to 2n that input receive signals y1(i) to yn(i) from far-end sides at each sampling time and outputs them to near-end sides. Transmission signal input/output terminals 31 to 3n/41 to 4n input from the near-end path transmission signals x1(i) to xn(i) where near-end talking signals are superimposed on the echo signals that are reflections of the receive signals y1(i) to yn(i) from the echo paths through the transmission signal input terminals 31 to 3n, and output residual signals e1(i) to en(i) which are subtractions of the echo replicas r1(i) to rn(i) from the transmission signals x1(i) to xn(i).

Finite impulse response (FIR) filter sections 51b to 5nb input y1(i) to yn(i) from the receive-signal input terminals 11 to 1n and store filter coefficients which are estimated impulse responses of the echo paths and produce the echo replicas r1(i) to rn(i) by calculating convolutions of the filter coefficients and y1(i) to yn(i), and output e1(i) to en(i). Subtractors 61 to 6n input x1(i) to xn(i) from the transmission-signal input terminals 3i to 3n and r1(i) to rn(i) from the FIR filter sections 51b to 5nb and produce the residual signals e1(i) to en(i) by subtracting r1(i) to rn(i) from x1(i) to xn(i), respectively, and output e1(i) to en(i).

Double-talk detection circuits 81 to 8n monitor the powers of y1(i) to yn(i), x1(i) to xn(i) and r1(i) to rn(i), and judge the presence/absence of the double-talk state (the powers of both the transmission signal and the receive signal are high)/the silent state (the power of the receive signal is low), and output detection signals of "0" in either the double-talk state or the silent state, and output signals of "1" in the other states to filter coefficients update circuits 71 to 7n.

Filter coefficient update circuits 71 to 7n conduct update processing in accordance with detection signals from the double-talk detection circuits 81 to 8n in such a manner that the filter coefficients (impulse response estimated values) stored in the FIR filter sections 51b to 5nb are controlled so that e1(i) to en(i) approach 0 in no double-talk state and in no silent state, and so that the update processing is stopped in the double-talk state or in the silent state.

The above-mentioned conventional multi-channel echo canceller is of the system (each-channel-independent echo canceling system) for canceling echoes by a processing complexity n times as much as the processing complexity for one channel.

The operation of the FIR filter section 5zb (z=1 to n) is, for example, as shown in FIG. 31 of Japanese Patent Unexamined Publication No. Hei 2-305231. The receive-signal register 51z stores yz(i) newly inputted from the receive-signal input terminal 1z after cutting off the oldest yz(i–h) (h is a natural number and the number of stored samples) and hold finite predetermined h number of samples of yz(i), yz(i–1), ... yz(i–h+1). The filter coefficient register 52z stores the filter coefficient for the number h of samples which is the same as that of the receive-signal register 51z. In this example, when the echo signal contained in the transmission signal xz(i) is completely removed by the echo replica rz(i) whereby the residual signal ez(i) becomes 0, the complete estimation of the echo path characteristic can be performed, and the filter coefficient $ax_k(i)$ becomes a value identical with that of $ax_k(i-1)$ before one sample time and held as it is. Furthermore, a convolution calculator 53z calculates convolution of receive signals yz (i–k) with the filter coefficients $az_k(i)$ to product an echo replica rz(i)= $\Sigma_k az_k(i)$ yz(i–k) (k=0 to h–1).

Also, in the case of two-channel echo canceller, conventional multi-channel echo canceller is disclosed in Japanese Patent Unexamined Publication No. Hei 4-284732, as shown in FIG. 32. Receive-signal input terminals 801/802 and receive-signal output terminals (speakers) 803/804 input the receive signals y1(i)/y2(i) from the far-end side at each sampling time i and output them to the near-end side. Transmission-signal input terminals (microphones) 805/806 and transmission-signal output terminals 807/808 input transmission signals x1(i)/x2(i) containing the echo signals that are reflections of the receive signals y1(i) to y2(i) from the echo path extending from the speakers 803/804 to the microphones 805/806 from the near-end side, and output residual signals e1(i)/e2(i) which are subtractions of the echo replicas r1(i) to rn(i) from the transmission signals x1(i)/x2(i). Adaptive filters 809/810 produce echo replicas r1(i)/r2(i) which are controlled so that e1(i)/e2(i) approach 0. A phrase-difference detector 814 estimates a phase difference between y1(i) to y2(i). A selector 813 selects y1(i) or y2(i) whose phase is faster than that of another and outputs it to adaptive filters 809/810.

The above-mentioned conventional multi-channel echo canceller is of the system (each-channel dependent echo canceling system) in which a plurality of echo paths are estimated through adaptive filter operation not independent in each channel to cancel the echo.

Also, in the case of a multi-point conference echo canceller, a conventional multi-channel echo canceller is disclosed in Japanese Patent Unexamined Publication No. Hei 2-87861, as shown in FIG. 33. Receive-signal input terminals 901 to 90n and receive-signal output terminals (speakers) 911 to 91n input receive-signals y1(i) to yn(i) from the far-end side at each sampling time i and output them to the near-end side through loss insertion circuits 961 to 96n. Transmission-signal input/output terminals 920/921 input from the near-end side a transmission signal x(i) containing the echo signals that are reflections of the receive signals y1(i) to yn(i) from the echo path extending from the speakers 911 to 91n to the transmission input terminal 920, and output the residual signal e(i) that is a subtraction of an echo replica r1(i) from a transmission signal x1(i) to the far-end side. A receive-talk channel selection circuit 942 select m (m is an integral number smaller than n) channels in which the levels of the receive signals are larger than those in other channels. Adaptive filters 931 to 93m produce the echo replicas r1(i) to rm(i) calculating convolutions of the receive signals and the filter coefficients stored in storage circuits 951 to 95n in selected m channels, and update the filter coefficients so that the residual signals e(i) approaches 0.

The above-mentioned multi-channel echo canceller is of the system (each-channel limited echo canceling system) in which adaptive filter operation is limited to the m-channels among all the n-channels to cancel the echo.

In the above-mentioned conventional multi-channel echo cancellers as shown in FIGS. 30 and 32, the amount of arithmetic operation is considerably increased in proportion to the number of channels because the adaptive filters in all channels always operate. Furthermore, in the above-mentioned conventional multi-channel echo cancellers as shown in FIG. 33, there arises such a problem that the adaptive filter may not permanently operate in a specified channel where the receive signal continues to be in a low level.

SUMMARY OF THE INVENTION

The present invention has been made to eliminate the above problems, and therefore an object of the present invention is to provide a system for canceling echoes in a plurality of channels while controlling the adaptive operation for each channel.

An echo canceller of the present invention is characterized by:

inputting/outputting receive signals to near-end sides from far-end sides at a plurality of receive-signal input/output terminals; inputting transmission signals from the near-end sides at a plurality of transmission signal input terminals;

outputting residual signals which are subtractions of echo replicas from the receive signals to the far-end sides at a plurality of transmission signal output terminals;

producing the echo replicas by calculating convolutions of filter coefficients and the receive signals to output them to the subtractors at a plurality of FIR filter units;

monitoring the powers of the transmission/receive signal and the residual signals to judge the presence/absence of double-talk/silent state to output detection signals at a plurality of double-talk detection circuits; and updating the filter coefficient stored in said plurality of FIR filter units in such a manner that update processing is conducted so that the residual signal approach 0 when it is not in said double-talk/silent state and so that update processing is stopped when it is in said double-talk/silent state at a plurality of filter coefficient updating circuits, and by the application of multi-channel uniform echo canceling system with the following means in order to solve the above problem.

A counter increments a count value for every given period.

A random number generator generates a random number every given time period.

A plurality of convergent-state detectors estimate the amount of echo attenuation for each channel from a power ratio of receive signals to residual signals.

A plurality of residual echo level detectors estimate a residual echo level for each channel from a power of the residual signals.

A plurality of signaling detectors monitor a signaling state of each channel in which the multi-channel echo canceling system is inserted, to judge whether the signaling state is idle, or not.

An adaptive operation control unit selects channels in which adaptive operation are conducted from all the channels for an every given period to output a produced selection signal to a plurality of AND circuits, in accordance with a count value from the counter, a random number from the random number generator, the estimation value of the amount of echo attenuation for each channel from the plurality of convergent-state detectors, or the estimation value of the residual echo level for each channel from the plurality of residual echo level detectors. Alternatively, it gives priority to channels which are not in double-talk/silent states and generates selection signals with respect to the detection signals from a plurality of double-talk detection circuits to output selection signals to a plurality of filter coefficient update circuits, instead of a plurality of AND circuits. Or, it gives priority to channels which are in busy states and generates selection signals with respect to state signals from a plurality of signaling detectors to output selection signals to the plurality of filter coefficient update circuits.

The plurality of AND circuits operate logical AND of the selection signals from the adaptive operation control unit and detection signals from the plurality of double-talk detectors to output produced control signals to the plurality of filter coefficient updating circuits.

The FIR filter unit of each channel has plural blocks of receive-signal registers which store receive signals of a predetermined number of samplings from the receive signal input terminal of the associated channel, and plural blocks of filter coefficient registers which store filter coefficients, and plural blocks of convolution calculators which calculate convolutions of the receive signals stored in the plural blocks of receive-signal registers and the filter coefficients stored in the plural blocks of filter coefficient registers and output them in blocks that input control signals of "1" from a block selecting section and output zeroes in other blocks, and plural blocks of coefficient power calculation sections which output the powers of the filter coefficients stored in the respective blocks of the filter coefficient registers, and the block selecting section which outputs, as the control signals, "1"s to the all blocks of convolution calculator when the control signal is "1" from the adaptive operation control unit or the AND circuit of the associated channel, and "1"s to the selected blocks of convolution calculator in such a manner that the powers of the filter coefficients of the selected blocks are larger than those of other blocks and "0"s to the other when the control signal is "0" from the adaptive operation control unit or the AND circuit of the associated channel. The channel adder of each channel outputs the sum of the calculation results from all the blocks of convolution calculator of associated channel to a subtractor of associated channel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 29 is a functional block diagram showing another embodiment of the FIR filter shown in FIGS. 1 to 5, 7, 9, 11, 13, 15, 17, 19, 21, 23, 25 and 27;

FIG. 30 is a functional block diagram showing a conventional echo canceller;

FIG. 31 is a functional block diagram showing another conventional echo canceller;

FIG. 32 is a functional block diagram showing another conventional echo canceller; and FIG. 33 is a functional block diagram showing another conventional echo canceller.

DETAILED DESCRIPTION OF THE PREFERRED EMBODIMENTS

Now, a description will be given in more details of preferred embodiments of the present invention with reference to the accompanying drawings.

Figure 1:
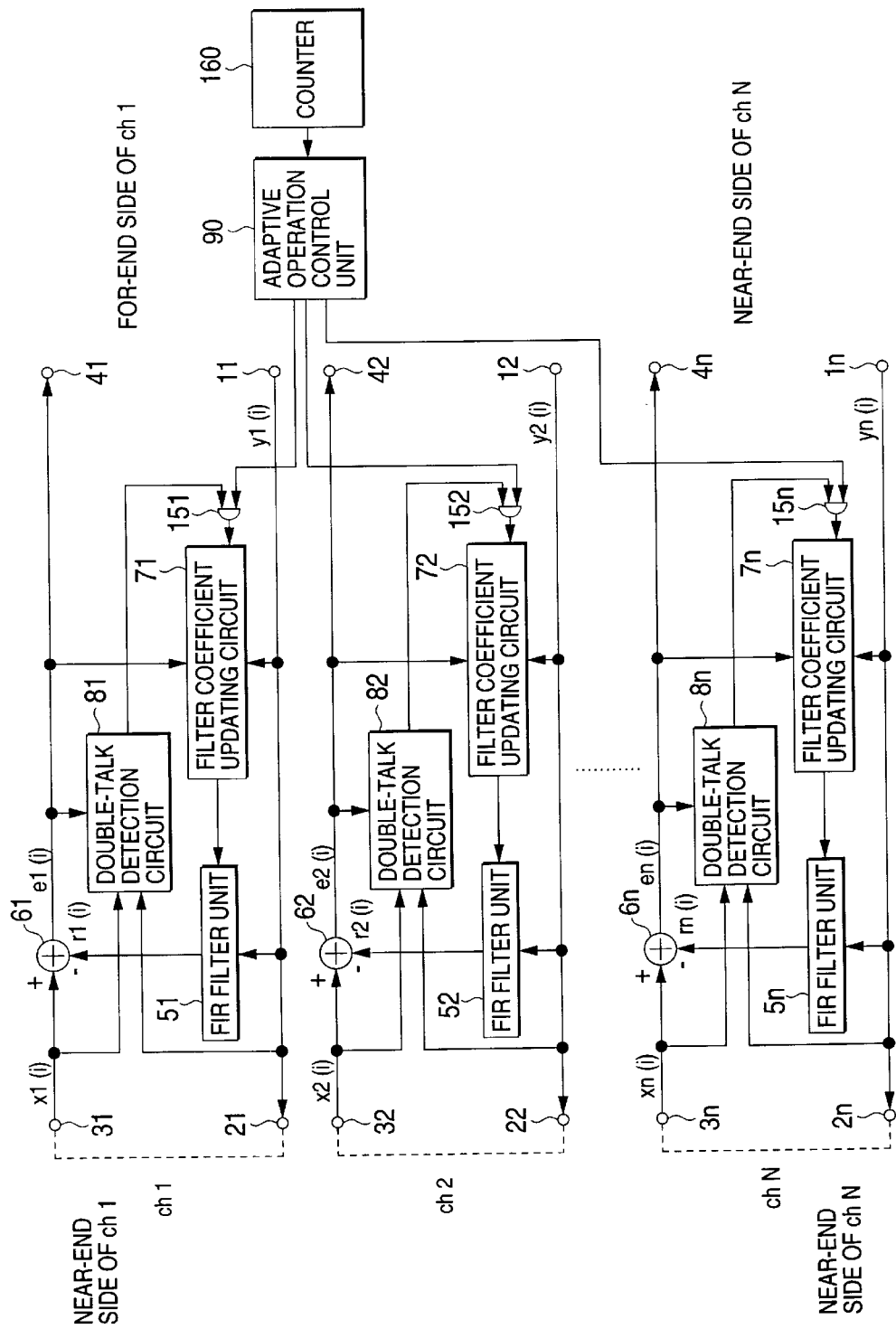
FIG. 1 is a functional block diagram showing an echo canceller in accordance with one embodiment of the present invention.

In an echo canceller according to one embodiment of the present invention, as shown in FIG. 1, receive-signal input terminals 11 to 1n, receive-signal output terminals 21 to 2n, transmission-signal input terminals 31 to 3n, transmission-signal output terminals 41 to 4n, FIR filter sections 51 to 5n, subtractors 61 to 6n, filter coefficient updating circuits 71 to 7n and double-talk detector circuits 81 to 8n correspond to those of the above conventional example shown in FIG. 30. An adaptive operation control unit 90 selects the m-channels (m is an integer smaller than n) in which the adaptive operations are done from all the n-channels every sampling time in accordance with the count value c (integers of 0 to n−1) from an n-notation counter 160 that increases the count value every given period, and outputs, as produced selection signals, "1"s to the selected m-channels of the AND circuits 151 to 15n and "0"s to other (n−m)-channels. The AND circuits 151 to 15n calculate the logical AND of the selection signals from the adaptive operation control unit 90 and the detection signals from the double-talk detection circuits 81 to 8n, and output the AND-operated signals as the control signals to the filter coefficient updating circuits 71 to 7n. Since the maximum number of channels in which the adaptive operation are done at a certain sample time is m, the processing complexity of the filter coefficient updating circuit can be reduced to at least m/n. Also, since the adaptive operation channel is selected in accordance with the count value, the echo canceling performance of each channel can be equivalent to that of other channels.

The echo canceller of the above embodiment is of the system in which the adaptive operation is controlled for each channel to cancel the echoes appearing in a plurality of channels.

In the adaptive operation control system according to the above embodiment, for example, it is assumed that the number n of all channels is 4, the number m of channels in which the adaptive operation are done is 2, and the count value c at a certain sampling time i is 3. Then, the adaptive operation control unit 90 selects channel numbers t(0)=4 and t(1)=1 in which the adaptive operation are done using an equation stated below, and output the selection signals of "1"s to the AND circuits 151, 154 of #1 and #4 channels which have been selected as channels in which the adaptive operation are done and output "0"s to the AND circuits 152, 153 of #2 and #3 channels which have not been selected.

$$t(i) = \text{mod}(c+i, n) + 1$$

i=0 to m−1
where mod (a,b) represents a residue of dividing a by b.

Subsequently, double-talk detection circuits 81, 84 and 82 and 83 judge whether the selected #1 and #4 channels and the non-selected #2 and #3 channels are in the double-talk/silent state, or not.

The AND circuits 151 to 154 input the selection signals from the adaptive operation control unit 90 and the detection signals of "0" or "1" from the double-talk detection circuits 81 to 84, and output the control signals "0" or "1" which are the results of operating logical AND of the selection signals and the detection signals. Further, when the control signals from the AND circuits are "0", the filter coefficient updating circuits 71 to 74 do not update the filter coefficients, but when the control signals are "1", the circuits update the filter coefficients.

Figure 2:
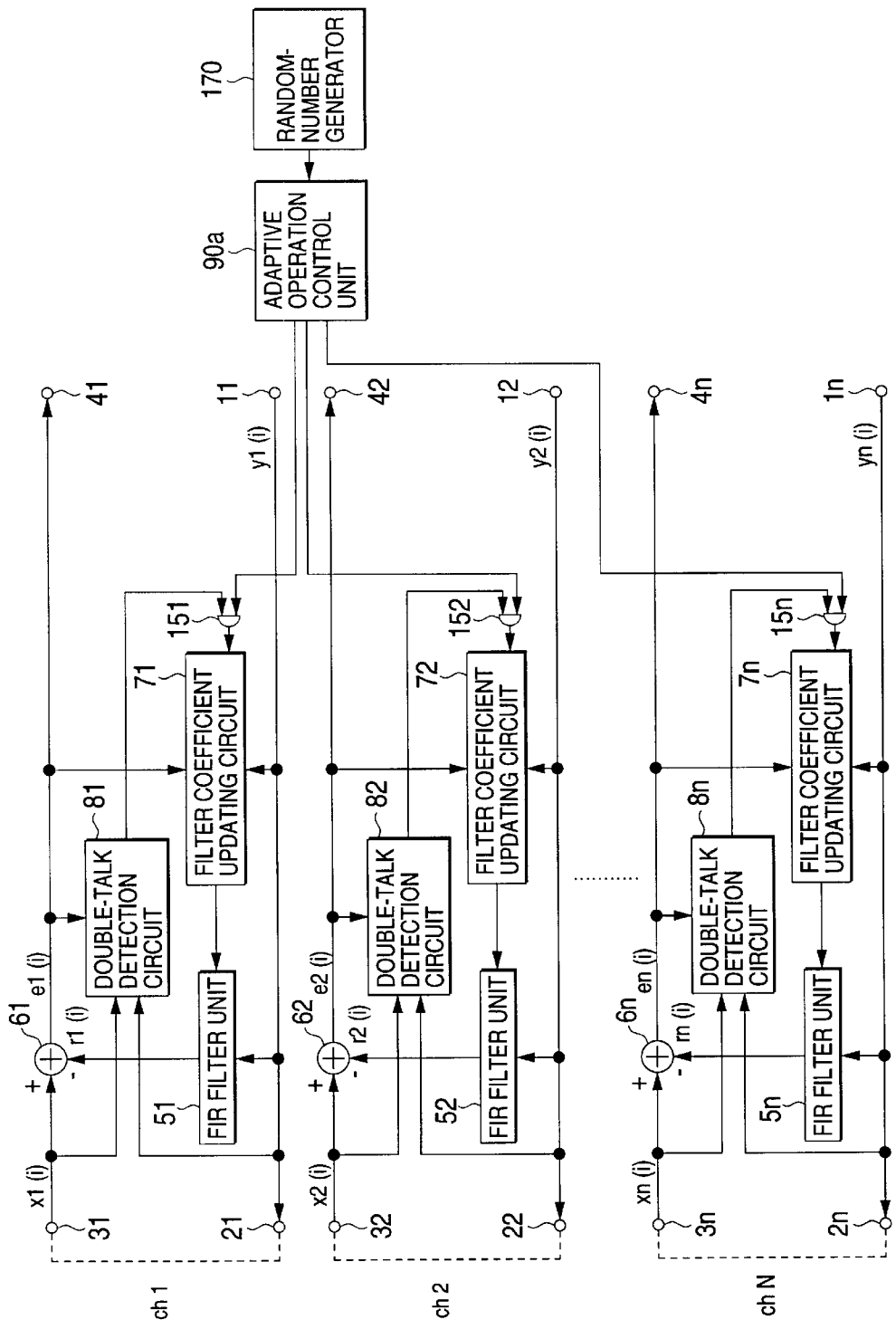
FIG. 2 is a functional block diagram showing an echo canceller in accordance with another embodiment of the present invention.

In the embodiment of the present invention shown in FIG. 2, the adaptive operation control unit 90 may be structured as an adaptive operation control unit 90a that selects channels in which the adaptive operation are done from all the n-channels every sampling time and produces selection signals in accordance with a random number r (an integral number of 0 to n−1) from a random number generator 170 which is provided instead of a counter 160 and generates the random number every given period. The same effect is obtained.

In the adaptive operation control system according to the above embodiment, for example, it is assumed that the number n of all channels is 4, the number m of channels in which the adaptive operation are done is 2, and the random number r at a certain sampling time i is 4. Then, the adaptive operation control unit 90a selects channel numbers t(0)=1 and t(1)=2 in which the adaptive operation are done using an equation stated below, and output the selection signals of "1"s to the AND circuits 151, 152 of #1 and #2 channels which have been selected as channels in which the adaptive operation are done and output "0"s to the AND circuits 153, 154 of #3 and #4 channels which have not been selected.

$$t(i) = \text{mod}(r+i, n) + 1$$

i=0 to m−1

Subsequently, double-talk detection circuits 81, 82 and 83 and 84 judge whether the selected #1 and #2 channels and the non-selected #3 and #4 channels are in the double-talk/silent state, or not.

The AND circuits 151 to 154 input the selection signals from the adaptive operation control unit 90a and the detection signals of "0" or "1" from the double-talk detection circuits 81 to 84, and output the control signals "0" or "1" which are the results of operating logical AND of selection signals and the detection signals. Further, when the control signals from the AND circuits are "0", the filter coefficient updating circuits 71 to 74 do not update the filter coefficients, but when the control signals are "1", the circuits update the filter coefficients.

Figure 3:
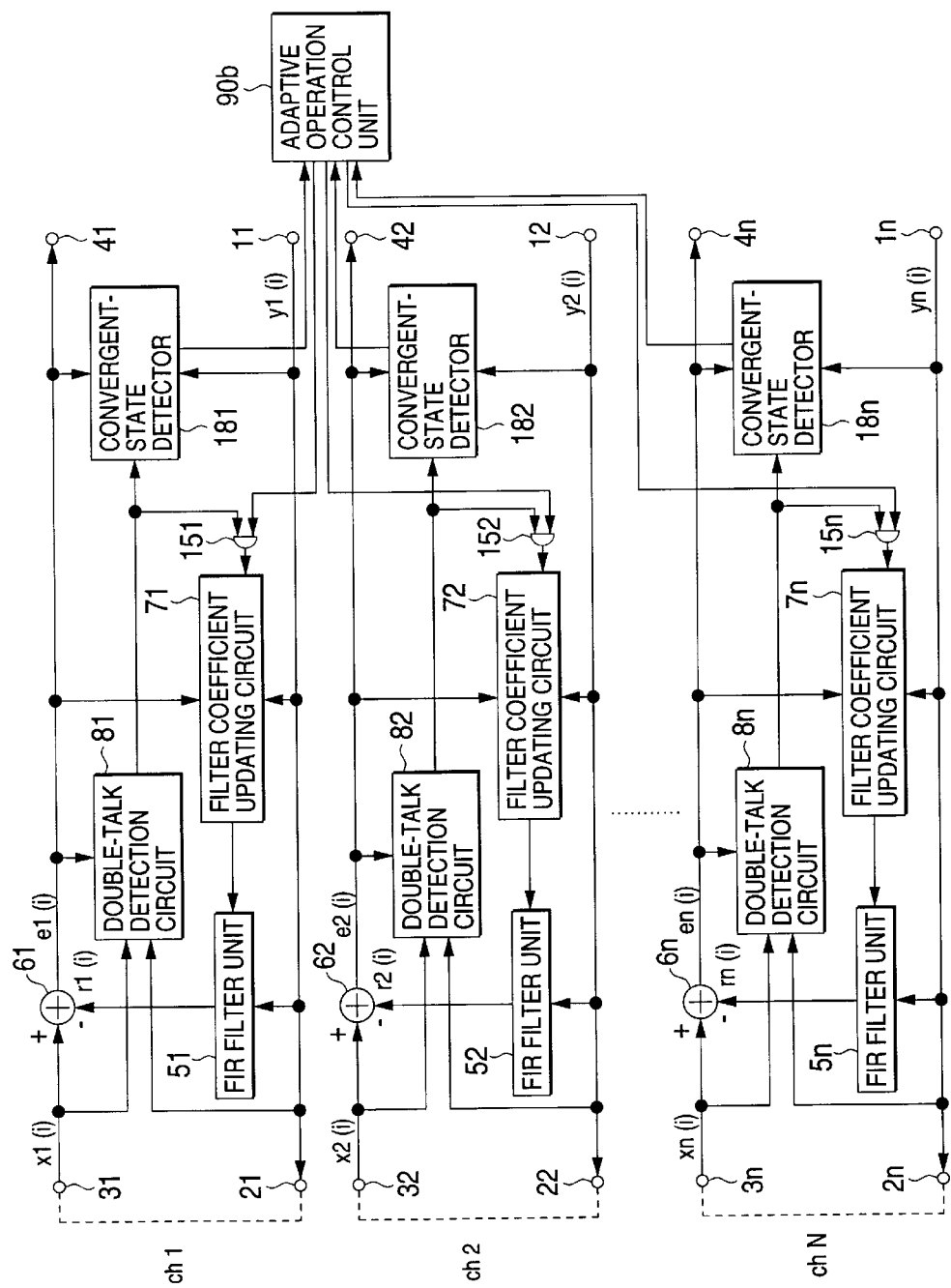
FIG. 3 is a functional block diagram showing an echo canceller in accordance with another embodiment of the present invention.

In the embodiment of the present invention shown in FIG. 3, the adaptive operation control unit 90 may be structured as an adaptive operation control unit 90b that selects channels in which the adaptive operation are done from all the channels every sampling time and produces selection signals in accordance with the estimation value of an echo attenuation amount from the convergent-state detectors 181 to 18n of the respective channels which are provided instead of a counter 160. The same effect is obtained.

The convergent-state detectors 181 to 18n estimate the amount of echo attenuation for each channel from a power ratio of the receive signals y1(i) to yn(i) from the receive-signal input terminals 11 to 1n to the residual signals e1(i) to 1n(i) from subtractors 61 to 6n. For example, it is assumed that the amount of echo attenuation in a channel k at the sampling time i is fk(i), the level of the receive signal is L(yk(i)), and the level of the residual signal is L(ek(i)). Then, fk(i) can be estimated by setting, when fk(i−1)>L(yk(i))/L(ek(i)), fk(i)=(1−α)fk(i−1), and when fk(i−1)<L(yk(i))/L(ek(i)), fk(i)=(1+β)fk(i−1) (α and β are values sufficiently smaller than 1). The convergent-state detectors 181 to 18n do not estimate the echo attenuation amount when the detection signal of the associated channel from the double-talk detection circuits 81 to 8n are "0".

In the adaptive operation control system of the above embodiment, for example, it is assumed that the number n of all channels is 4, the number m of channels in which the adaptive operation are done is 2, and the estimated values of the amount of echo attenuation at a certain sampling time i are 30/10/20/40 dB in the respective #1/#2/#3/#4 channels. Then, the adaptive operation control unit 90b outputs the selection signals of "1"s to the AND circuits 152, 153 of #2 and #3 channels which have been selected as channels in which the adaptive operation are done in the order of the smaller amount of echo attenuation and output "0"s to the AND circuits 151, 154 of #1 and #4 channels which have not been selected.

Subsequently, double-talk detection circuits 82, 83 and 81, 84 judge whether the selected #2 and #3 channels and the non-selected #1 and #4 channels are in the double-talk/silent state, or not.

The AND circuits 151 to 154 input the selection signals from the adaptive operation control unit 90b and the detection signals of "0" or "1" from the double-talk detection circuits 81 to 84, and output the control signals "0" or "1" which are the results of operating logical AND of selection signals and the detection signals. Further, when the control signals from the AND circuits are "0", the filter coefficient updating circuits 71 to 74 do not update the filter coefficients, but when the control signals are "1", the circuits update the filter coefficients.

Figure 4:
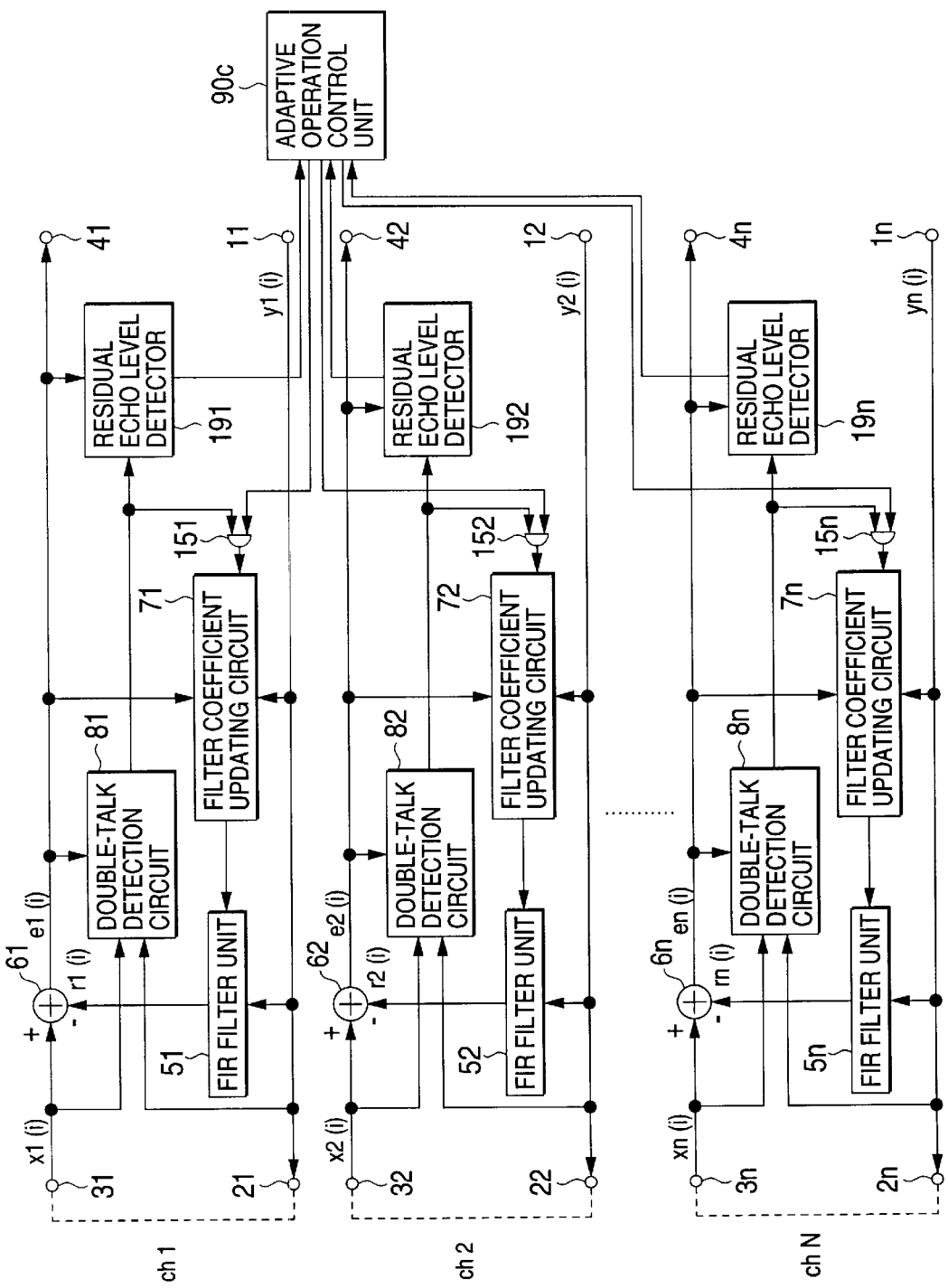
FIG. 4 is a functional block diagram showing an echo canceller in accordance with another embodiment of the present invention.
Figure 5:
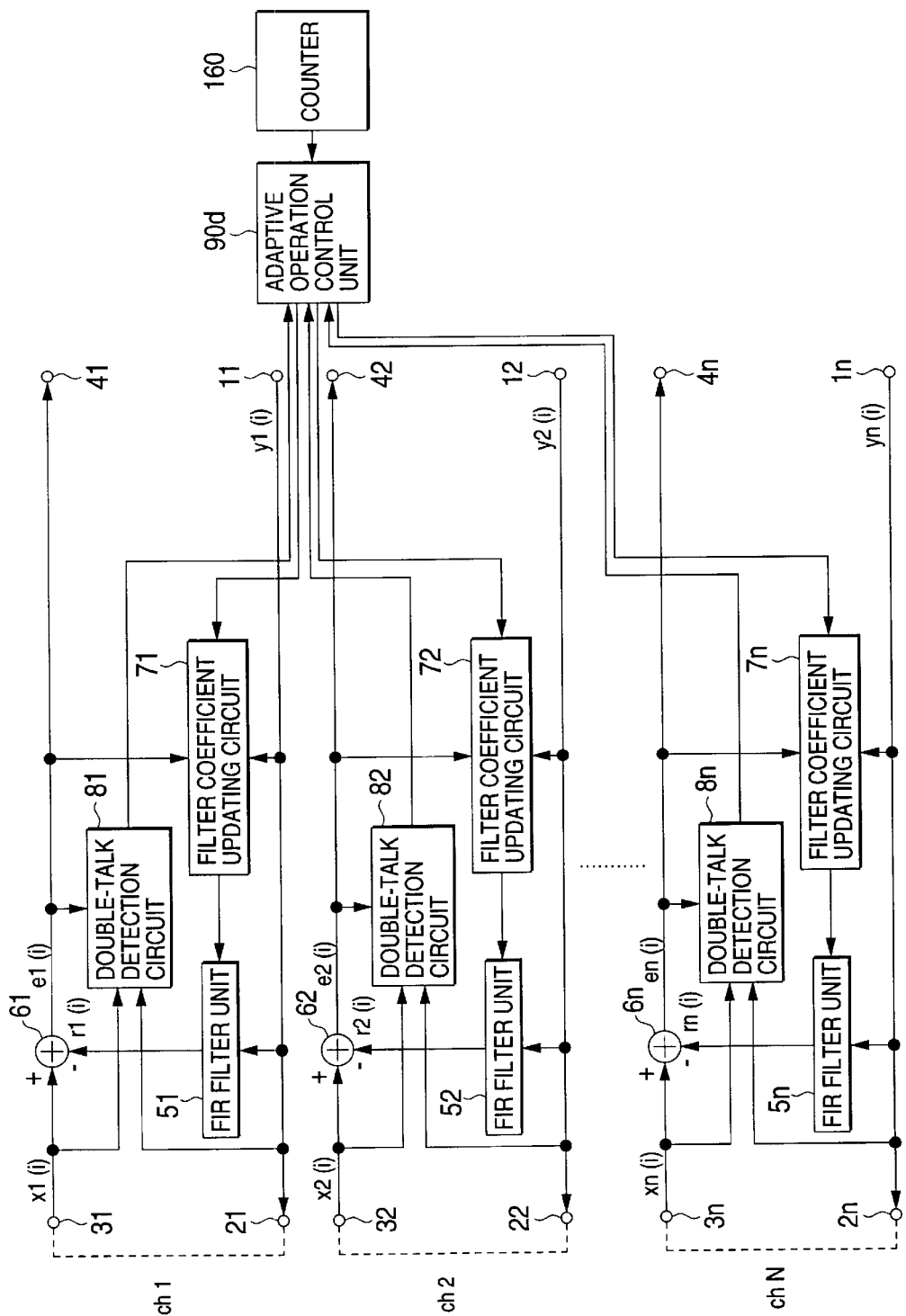
FIG. 5 is a functional block diagram showing an echo canceller in accordance with another embodiment of the present invention.

In the embodiment of the present invention shown in FIG. 4, the adaptive operation control unit 90 may be structured as an adaptive operation control unit 90c that selects channels in which the adaptive operation are done from all the channels every sampling time and produces selection signals in accordance with the estimation value of a residual echo level from the residual echo level detectors 191 to 19n of the respective channels which are provided instead of a counter 160. The same effect is obtained.

The residual echo level detectors 191 to 19n estimate the residual echo level for each channel from a power of the residual signals e1(i) to en(i) from the subtractors 61 to 6n. For example, the residual echo level gk(i) in a channel k at the sampling time i can be estimated by setting, when gk(i−1)>L(ek(i)), gk(i)=(1−α)gk(i−1), and when gk(i−1)<L(ek(i)), gk(i)=(1+β)gk(i−1). The residual echo level detectors 191 to 19n do not estimate the residual echo level when the detection signal of the associated channel from the double-talk detection circuits 81 to 8n are "0".

In the adaptive operation control system of the above embodiment, for example, it is assumed that the number n of all channels is 4, the number m of channels in which the adaptive operation are done is 2, and the estimated value of the residual echo level at a certain sampling time i are −30/−10/−20/−40 dBm0 in the respective #1/#2/#3/#4 channels. Then, the adaptive operation control unit 90c outputs the selection signals of "1"s to the AND circuits 152, 153 of #2 and #3 channels which have been selected as channels in which the adaptive operation are done in the order of the higher residual echo level and output "0"s to the AND circuits 151, 154 of #1 and #4 channels which have not been selected. The operation of the AND circuits 152, 153 and 151, 154, the filter coefficient circuits 72, 73 and 71, 74 are identical with the embodiment shown in FIG. 3.

Also, the adaptive operation control unit 90, 90a, 90b and 90c in accordance with the embodiments of the present invention shown in FIGS. 1, 2, 3 and 4 may be structured as adaptive operation control units 90d, 90e, 90f and 90g which give priority to a channel which is not in a double-talk/silent state and generates a selection signal with respect to the detection signals from a plurality of double-talk detection circuits 81 to 8n to output the generated selection signal as the control signal of "1" and "0" to a plurality of filter coefficient update circuits 71 to 7n, as shown in FIGS. 5, 7, 9 and 11. The same effect is obtained.

Figure 6:
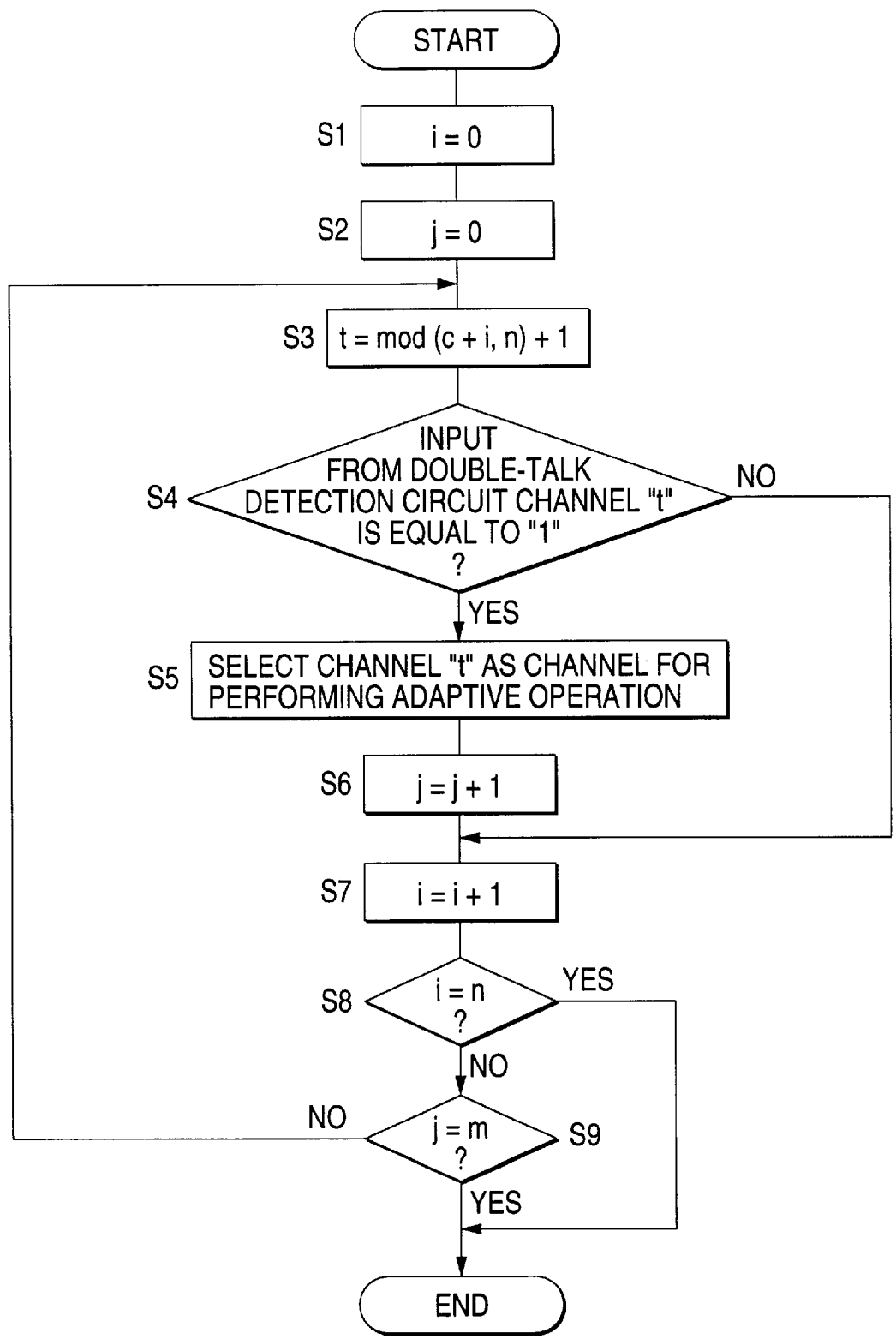
FIG. 6 is a flowchart for explanation of the function of an adaptive operation control unit shown in FIG. 5.
Figure 7:
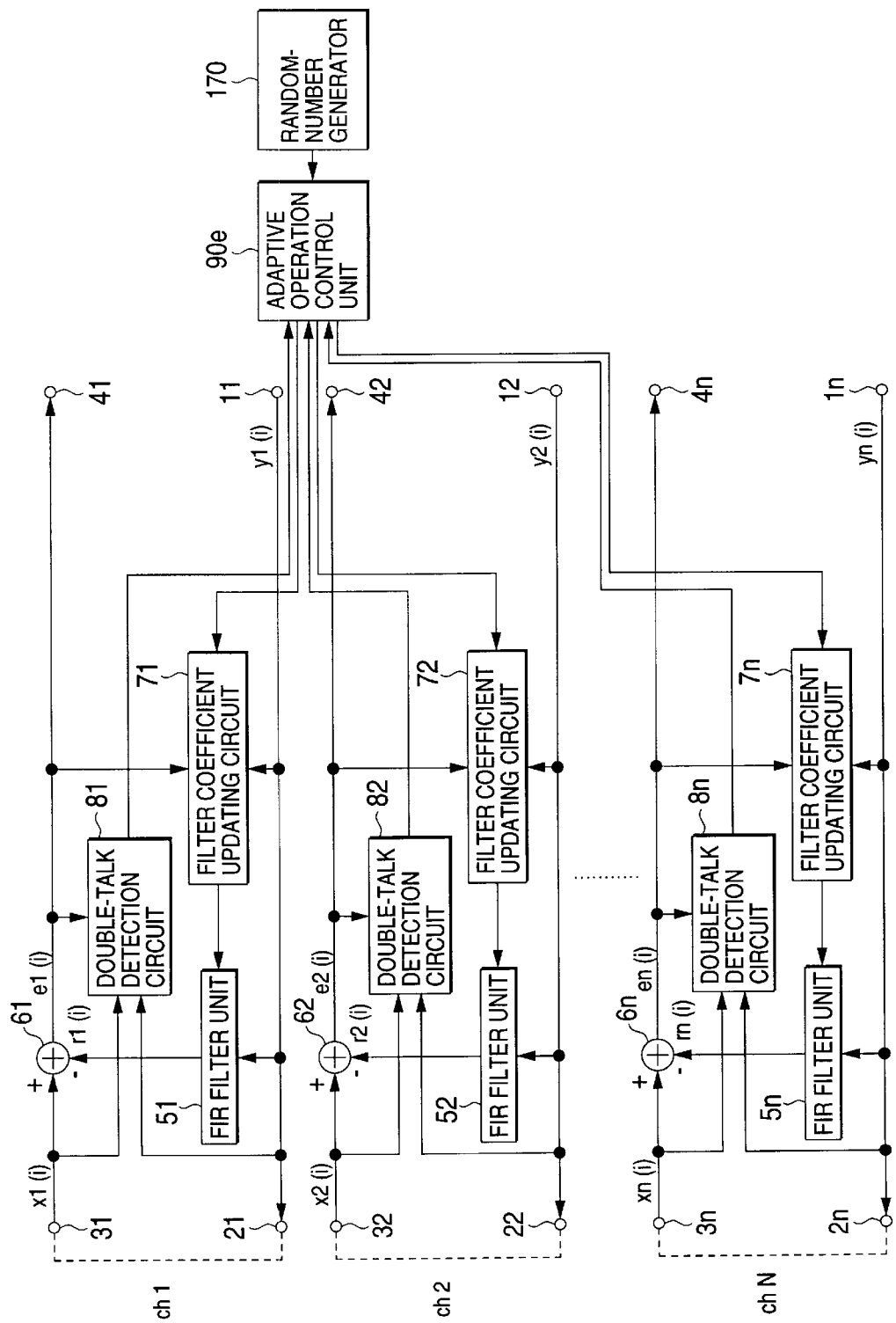
FIG. 7 is a functional block diagram showing an echo canceller in accordance with another embodiment of the present invention.
Figure 8:
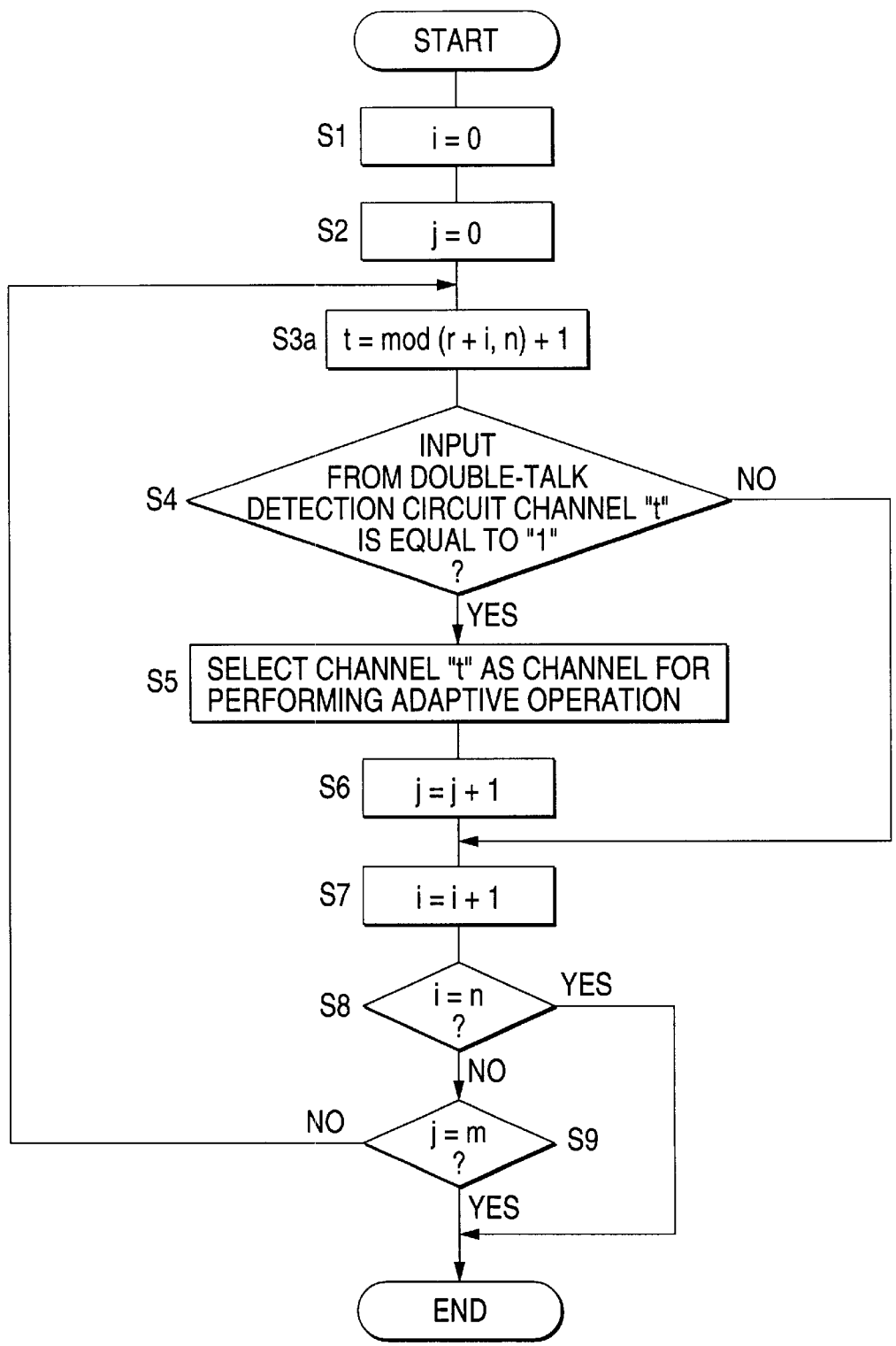
FIG. 8 is a flowchart for explanation of the function of an adaptive operation control unit shown in FIG. 7.
Figure 9:
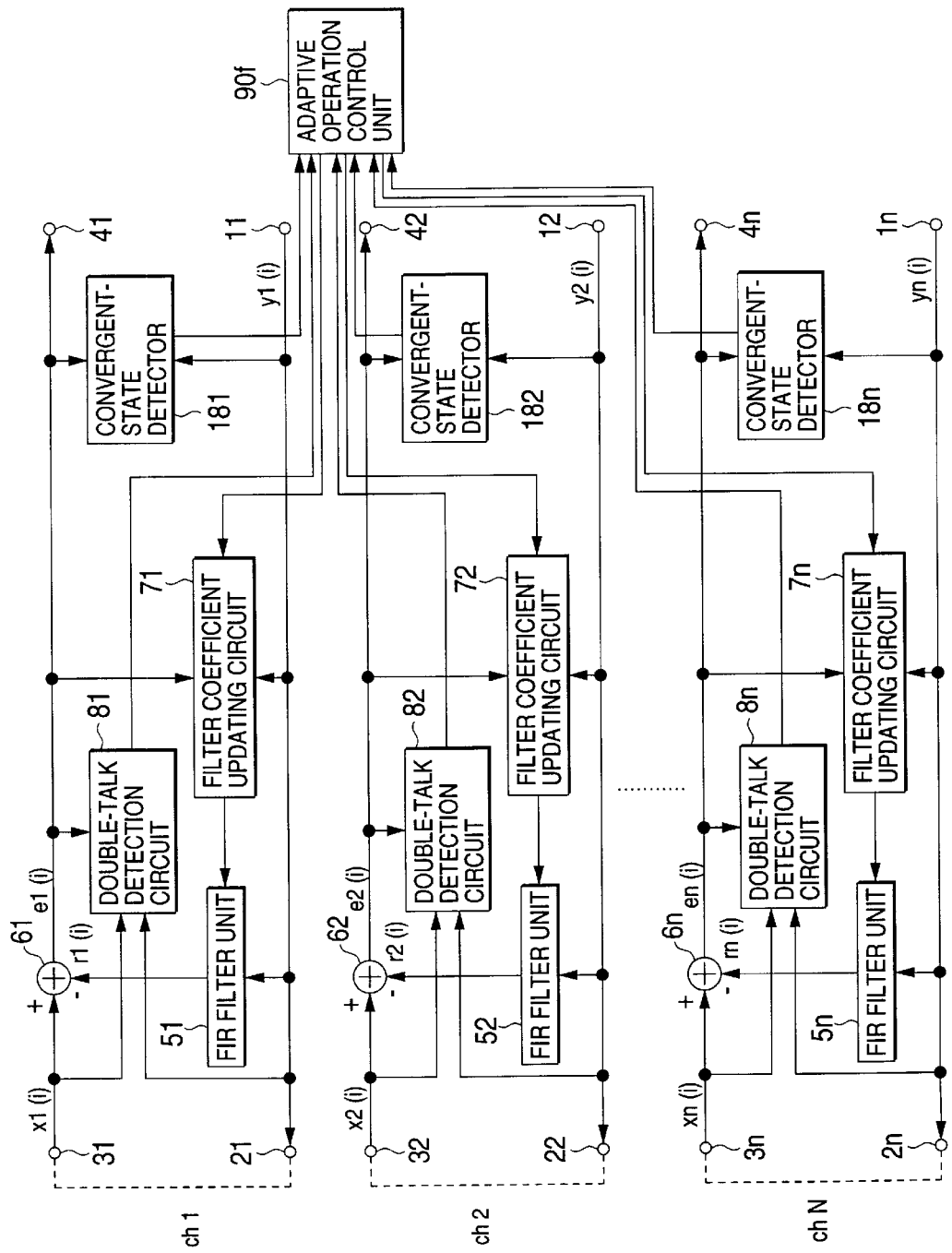
FIG. 9 is a functional block diagram showing an echo canceller in accordance with another embodiment of the present invention.

The adaptive operation control units 90d/90e, when selecting the m-channels in which the adaptive operation are done from all the n-channels, at first, reset variables i and j, as shown in FIGS. 6 and 8 (steps s1 and s2 in FIGS. 6 and 8).

Next, a channel number t, that is a candidate channel in which the adaptive operation is done, is calculated from the following equation in accordance with the count value c/the random number r from the counter 160/the random number generator 170 (step s3 in FIG. 6/step s3a in FIG. 8).

$$t = mod\ (c+i,\ n)+1$$
$$i=0$$

$$t = mod\ (r+i,\ n)+1$$
$$i=0$$

Subsequently, the adaptive operation control units 90d/90e input the detection signal of "0" or "1" from the double-talk detection circuit 8t which judge whether #t channel status is the double-talk/silent state, or not, and selects the channel as a channel in which the adaptive operation is done when it is "1", but does not select the channel as a channel in which the adaptive operation is done when it is "0" (steps s4 and s5 in FIGS. 6 and 8). Further, the adaptive operation control units 90d/90e terminate the operation when i=n or j=m (m-channels can be selected) (steps s6 to s9 in FIGS. 6 and 8), and output the respective control signals of "1"s to the filter coefficient updating circuits 71 to 7n of the selected channels and output the respective control signals of "0"s to others.

Figure 10:
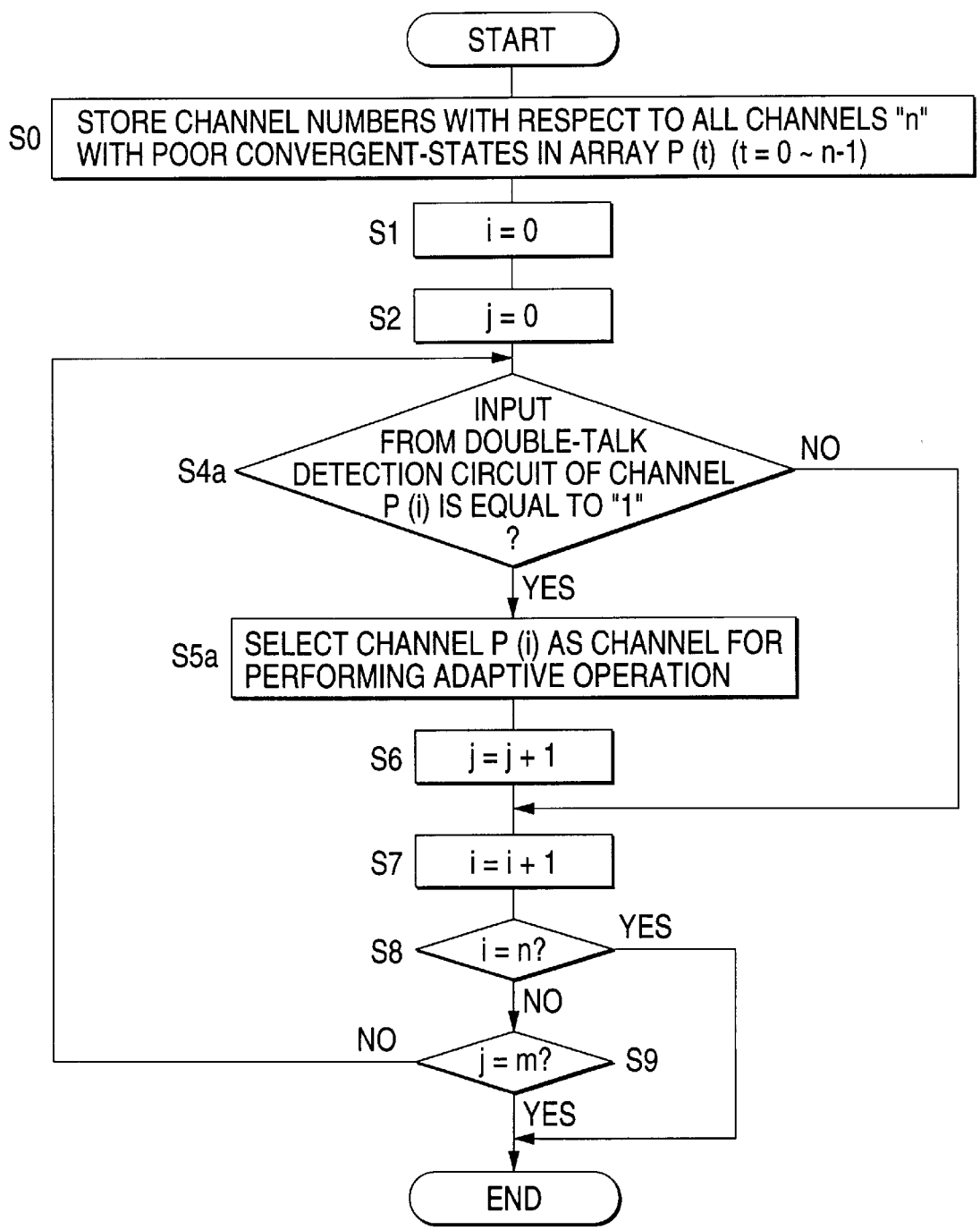
FIG. 10 is a flowchart for explanation of the function of an adaptive operation control unit shown in FIG. 9.
Figure 11:
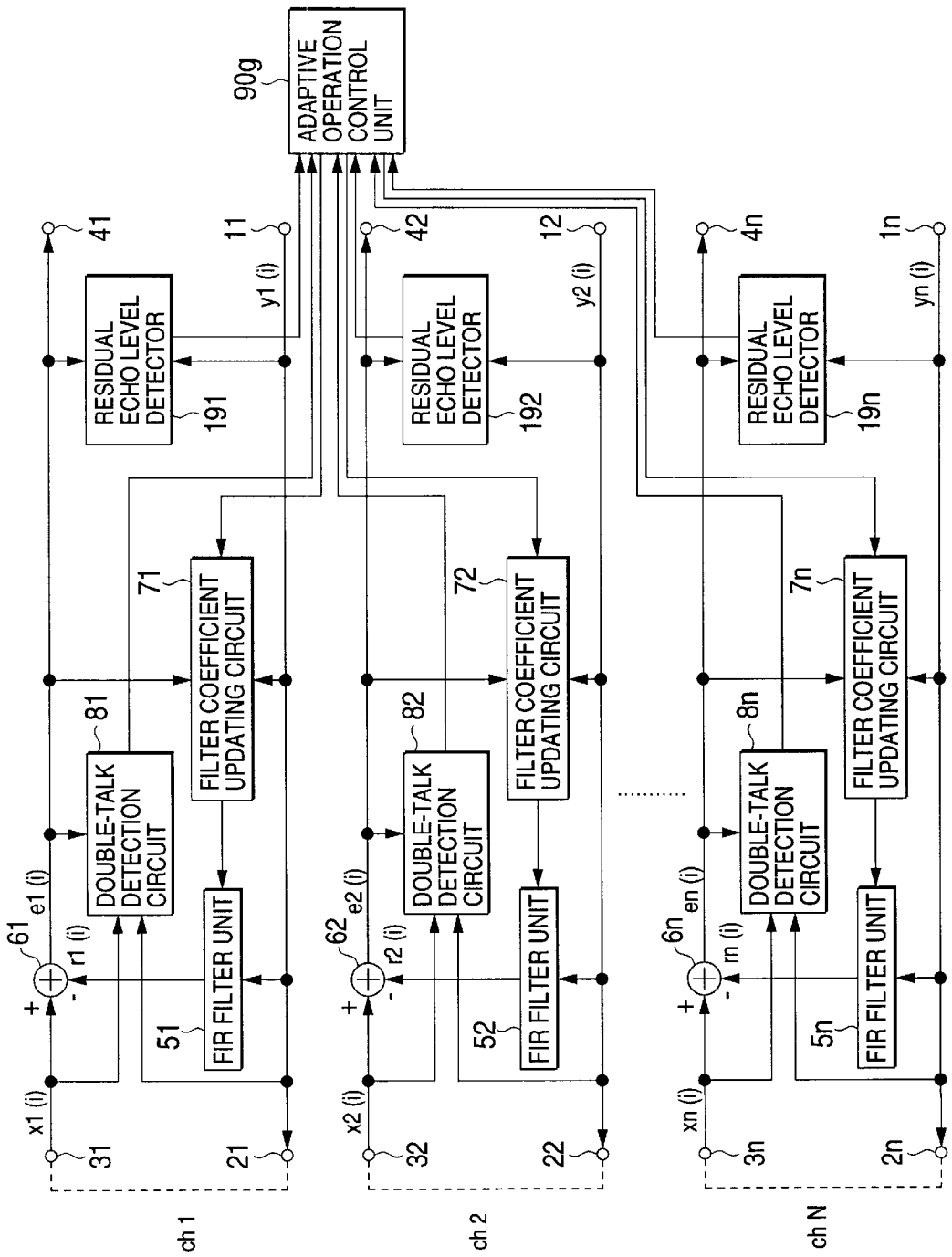
FIG. 11 is a functional block diagram showing an echo canceller in accordance with another embodiment of the present invention.
Figure 12:
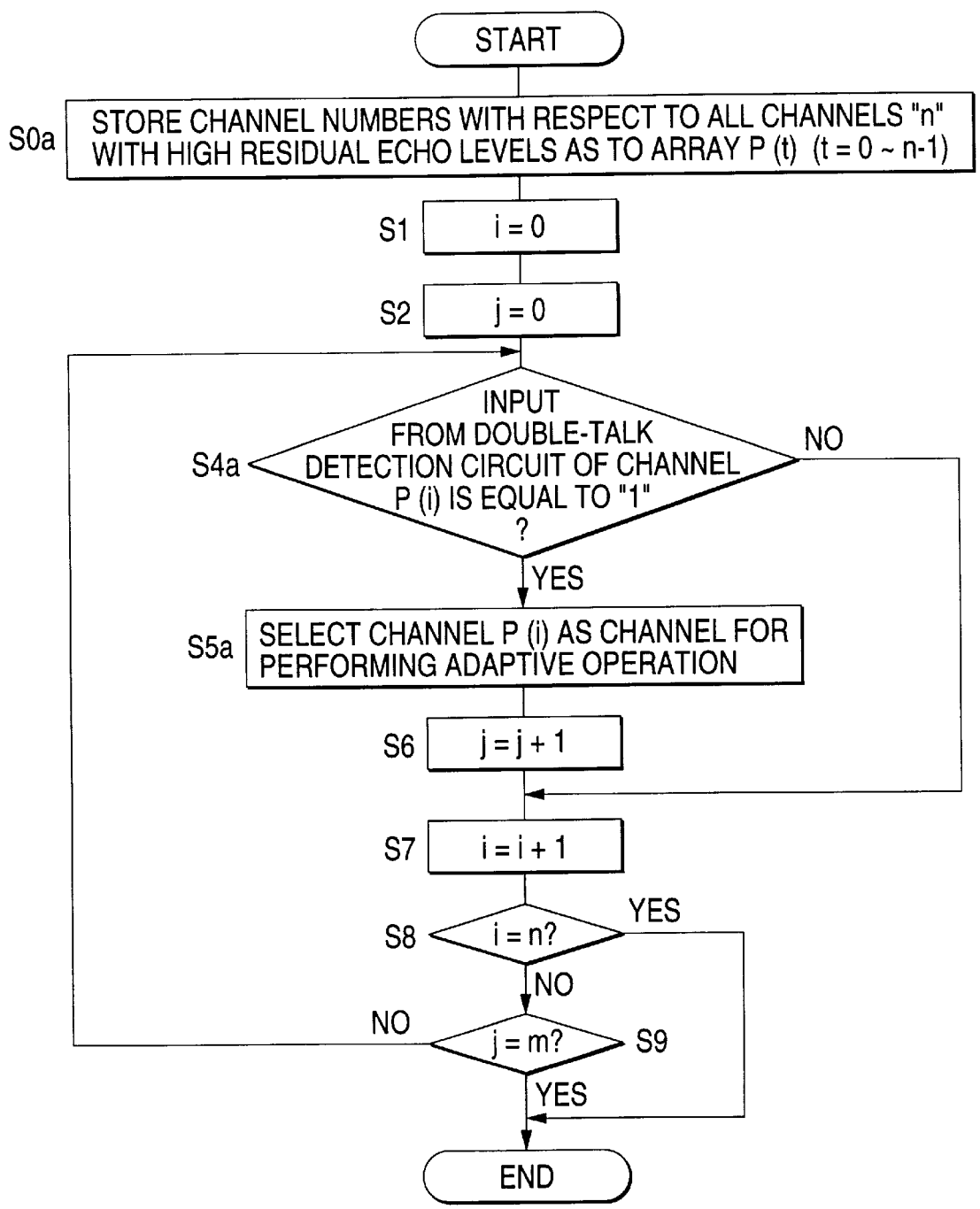
FIG. 12 is a flowchart for explanation of the function of an adaptive operation control unit shown in FIG. 11.
Figure 13:
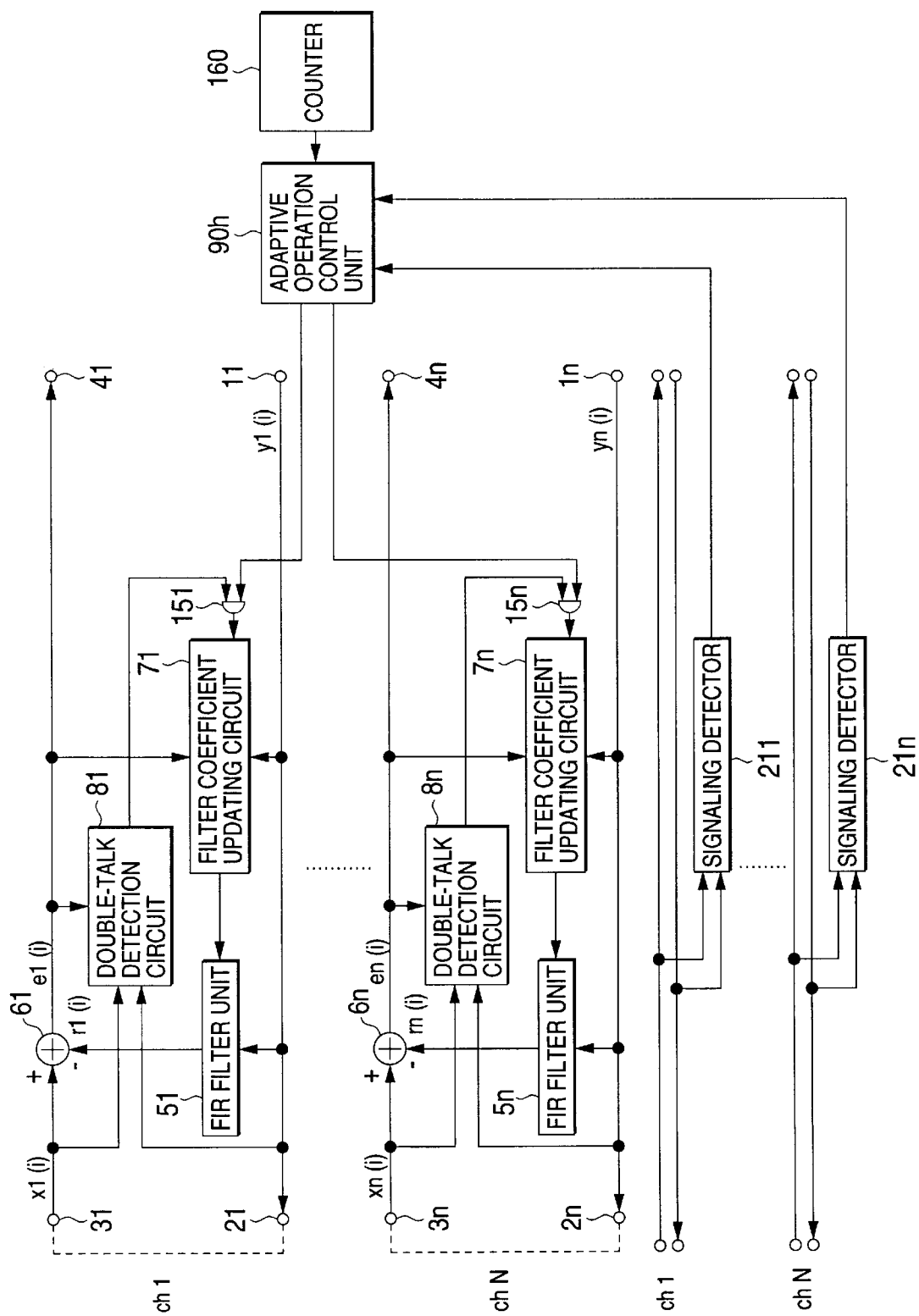
FIG. 13 is a functional block diagram showing an echo canceller in accordance with another embodiment of the present invention.

The adaptive operation control units 90f/90g, as shown in FIGS. 10 and 12, when selecting the m-channels in which the adaptive operation are done from all the n-channels, first input the estimation value of the echo attenuation amount/the estimation value of the residual echo level from the convergent-state detectors 181 to 18n/the residual echo level detectors 191 to 19n, and store channel numbers into a select priority buffer P in order of smaller estimated amount of echo attenuation/in order of higher residual echo levels in all the n-channels. Also, the adaptive operation control unit 90f/90g reset i and j (steps s1 and s2 in FIGS. 10 and 12). Then, the adaptive operation control units 90f/90g input the detection signal of "0" or "1" from the double-talk detection circuits 81 to 8n and get P(0), that is the 0th element of the select priority buffer P, and select the #P(0) channel as a channel in which the adaptive operation is done, when the detection signal from the double-talk detection circuit of the #P(0) channel is "1", but not select the channel when it is "0" (steps s4a and s5a in FIGS. 10 and 12). Further, the adaptive operation control units 90f/90g terminate the operation when i=n or j=m in the order of i=1, 2, . . . , and output the respective control signals of "1"s to the filter coefficient updating circuits 71 to 7n of the selected channels and output the respective control signals of "0"s to others (steps s6 to s9 in FIGS. 10 and 12).

Also, in the embodiments of the present invention shown in FIGS. 1 to 5, 7, 9 and 11, the adaptive operation control units 90, 90a, 90b, 90c, 90d, 90e, 90f and 90g may be structured by adaptive operation control units 90h, 90i, 90j, 90k, 90m, 90n, 90p and 90q which give priority to the channels which are in busy state, based on state signals from signaling detectors 211 to 21n which monitor the signaling state of the respective channels, judge whether it is in busy state, or not, and output the state signal "1" when it is in busy state and "0" when it is in idle state, as shown in FIGS. 13, 15, 17, 19, 21, 23, 25 and 27. The same effect is obtained.

Figure 14:
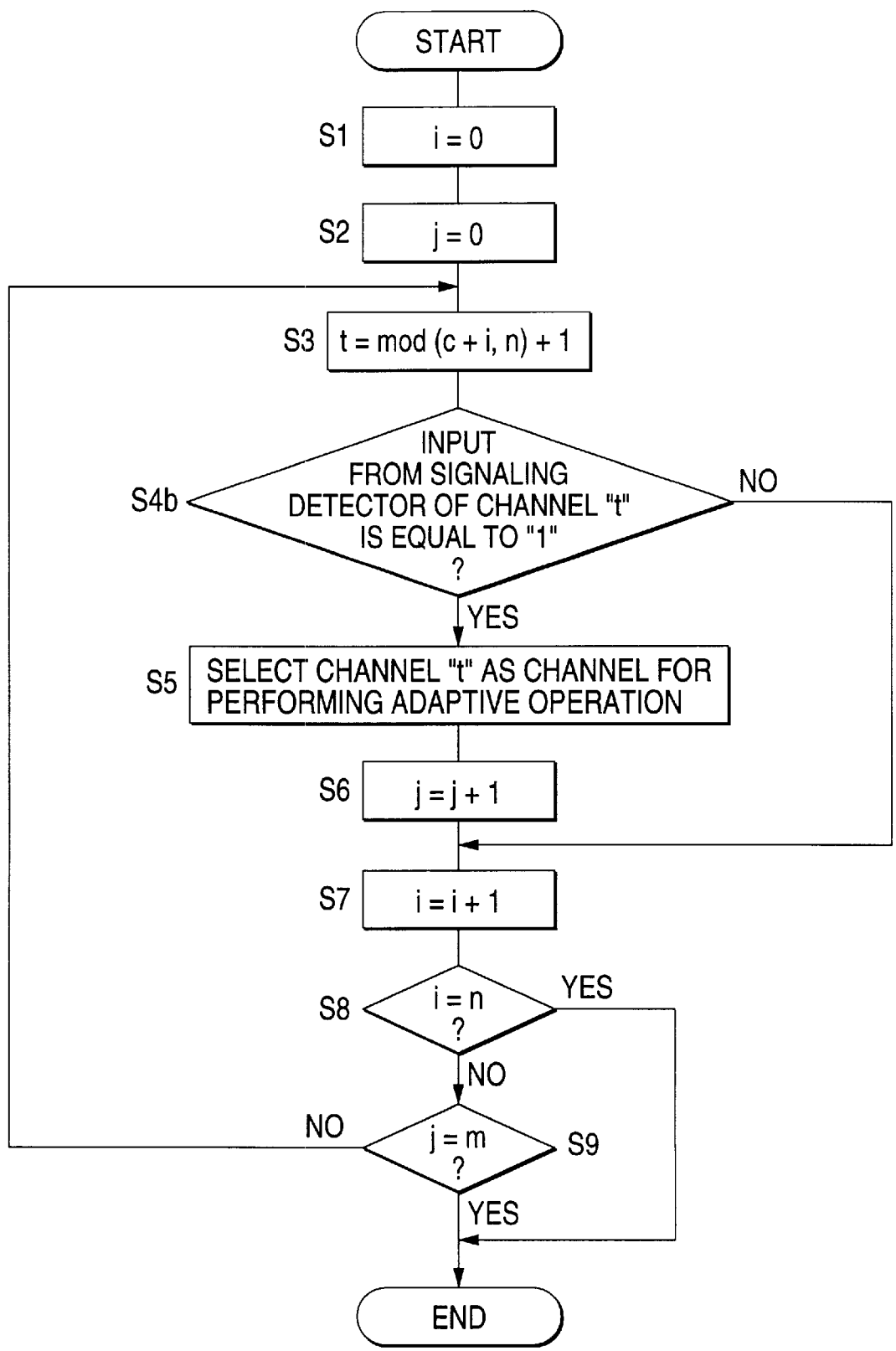
FIG. 14 is a flowchart for explanation of the function of an adaptive operation control unit shown in FIG. 13.
Figure 15:
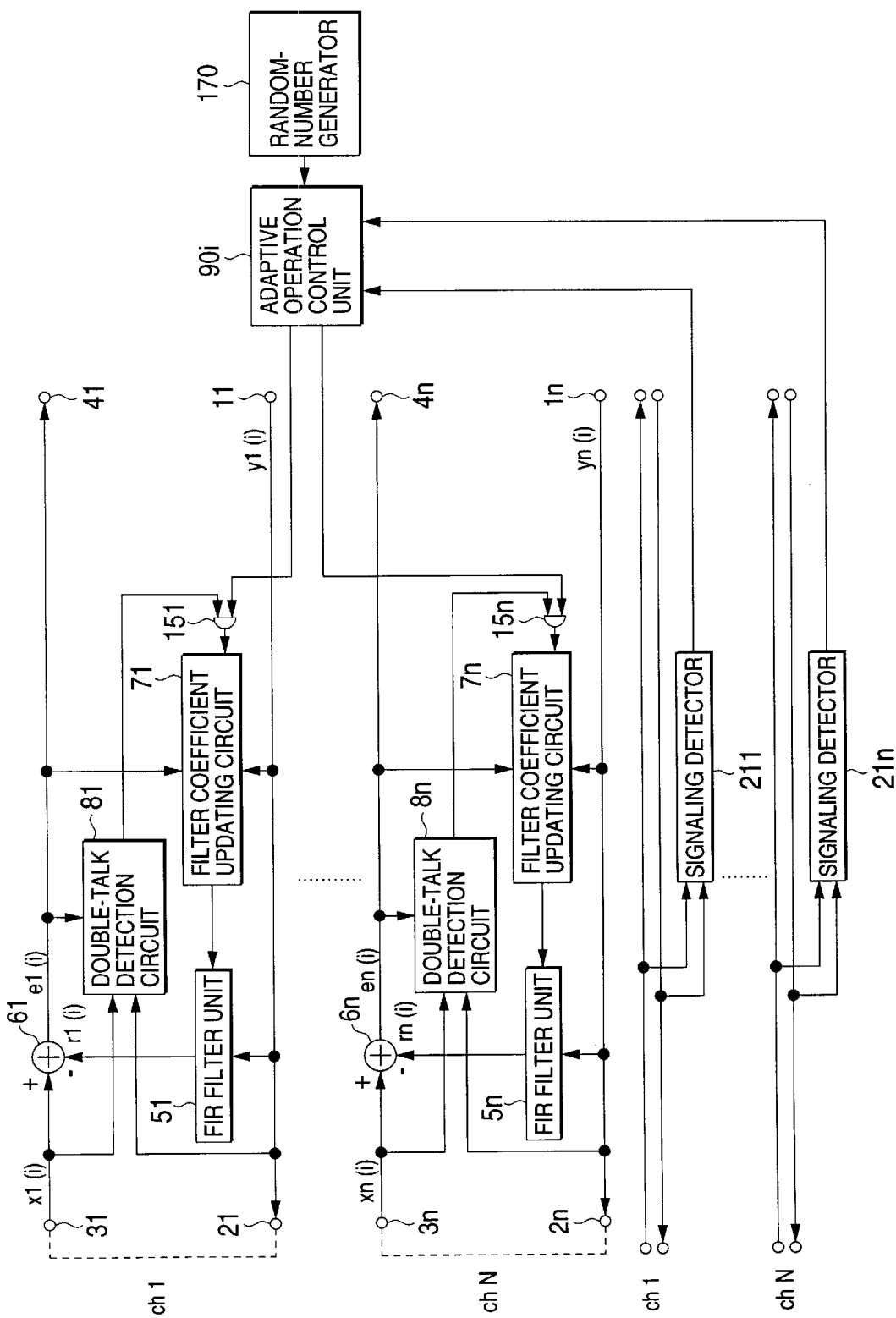
FIG. 15 is a functional block diagram showing an echo canceller in accordance with another embodiment of the present invention.
Figure 16:
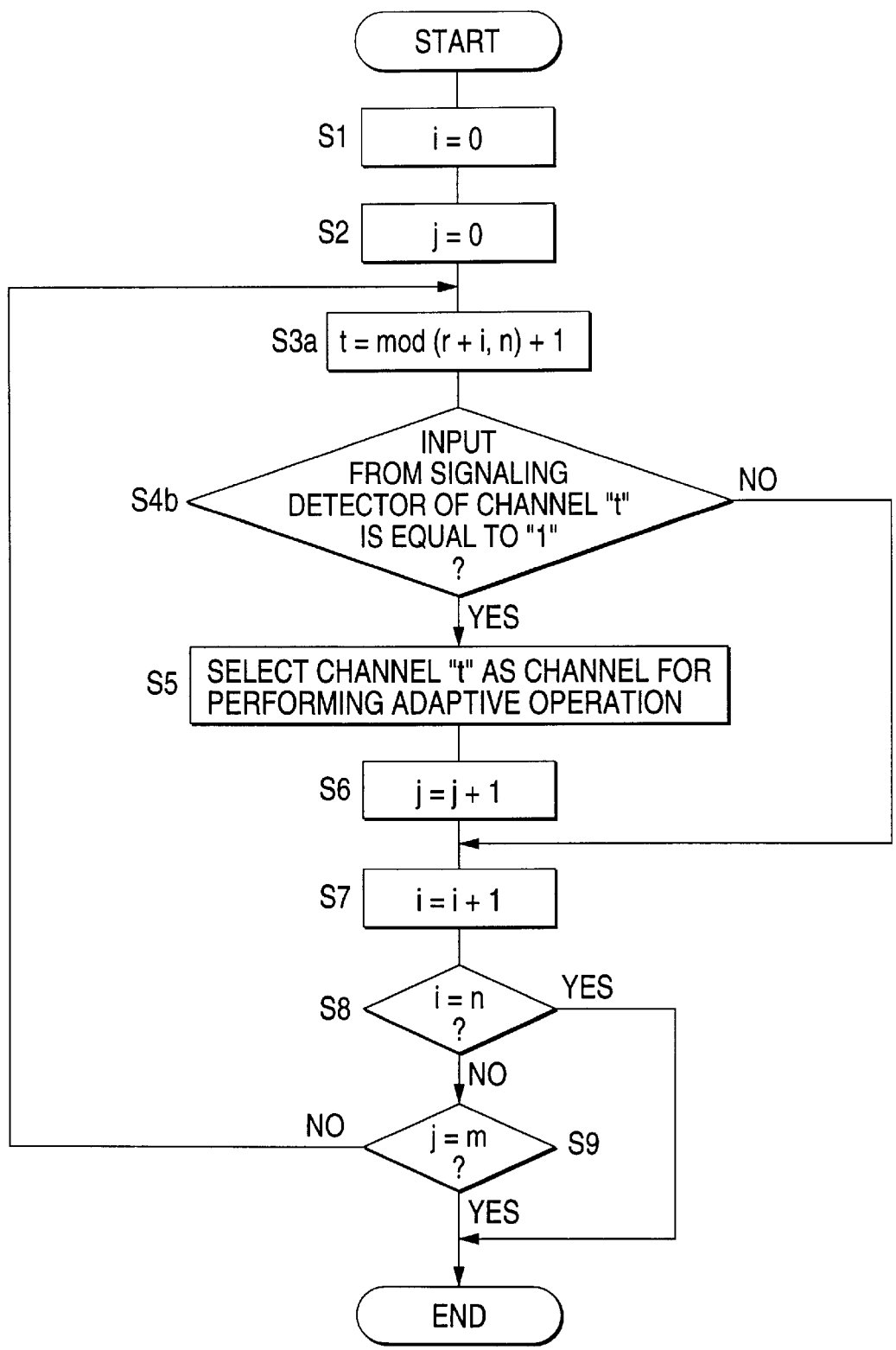
FIG. 16 is a flowchart for explanation of the function of an adaptive operation control unit shown in FIG. 15.
Figure 17:
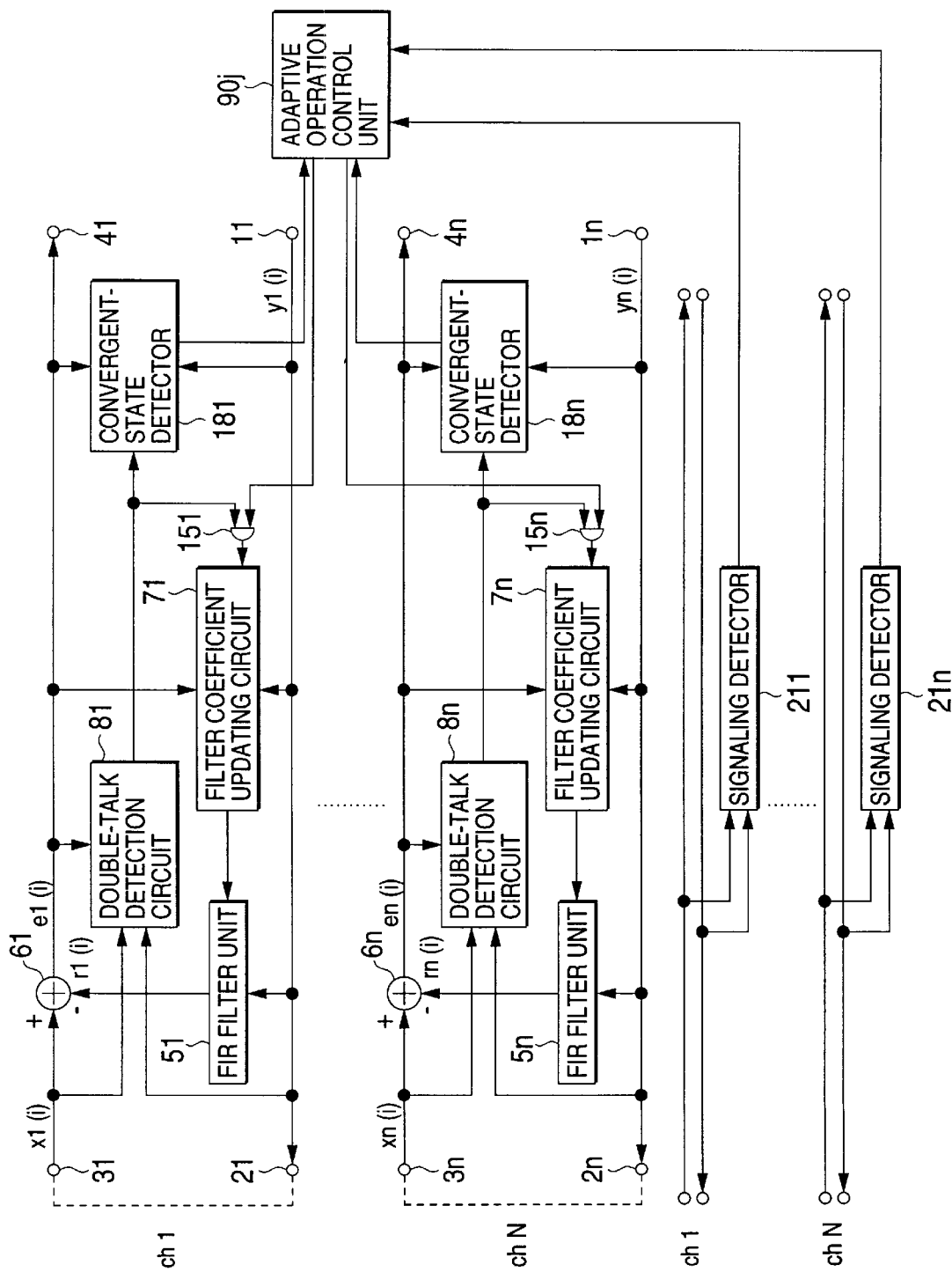
FIG. 17 is a functional block diagram showing an echo canceller in accordance with another embodiment of the present invention.

The adaptive operation control units 90h/90i, as shown in FIGS. 14 and 16, first conduct the same operation as that of the steps s1 to s3 in FIG. 6 and the steps s1 to s3a in FIG. 8 (steps s1 to s3 in FIG. 14, and steps s1 to s3a in FIG. 16). Then, they input the state signal of "1" or "0" from the signaling detectors 211 to 21n for judging whether the #t channel is in busy state, and select the channel as a channel in which the adaptive operation is done when the state signal from the signaling detector 21t is "1", but does not select the channel when it is "0" (steps s4b and s5 in FIGS. 14 and 16). Further, they conduct the same operation as the steps s6 to s9 in FIGS. 6 and 8 (the steps s6 to s9 in FIGS. 14 and 16).

Figure 18:
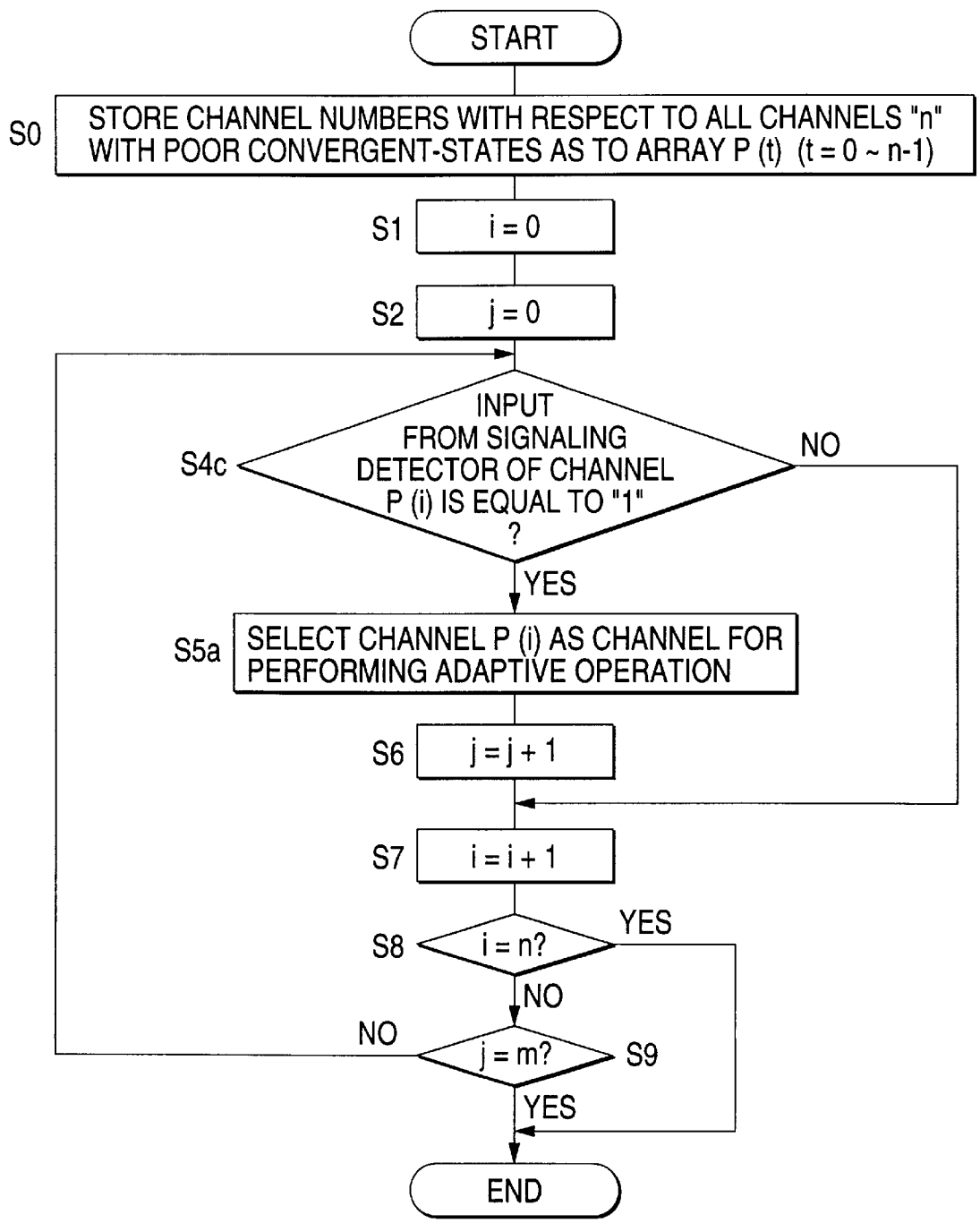
FIG. 18 is a flowchart for explanation of the function of an adaptive operation control unit shown in FIG. 17.
Figure 19:
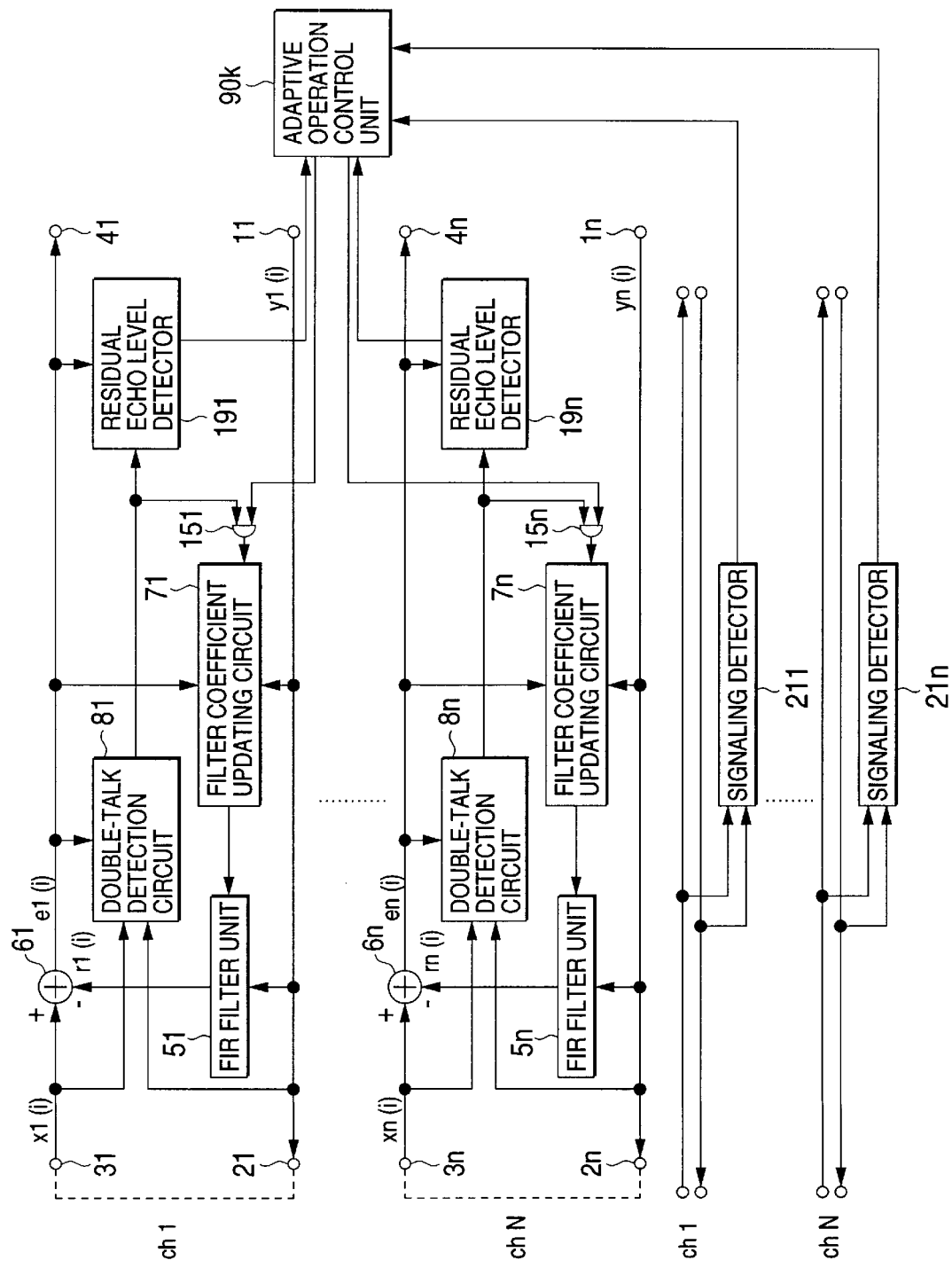
FIG. 19 is a functional block diagram showing an echo canceller in accordance with another embodiment of the present invention.
Figure 20:
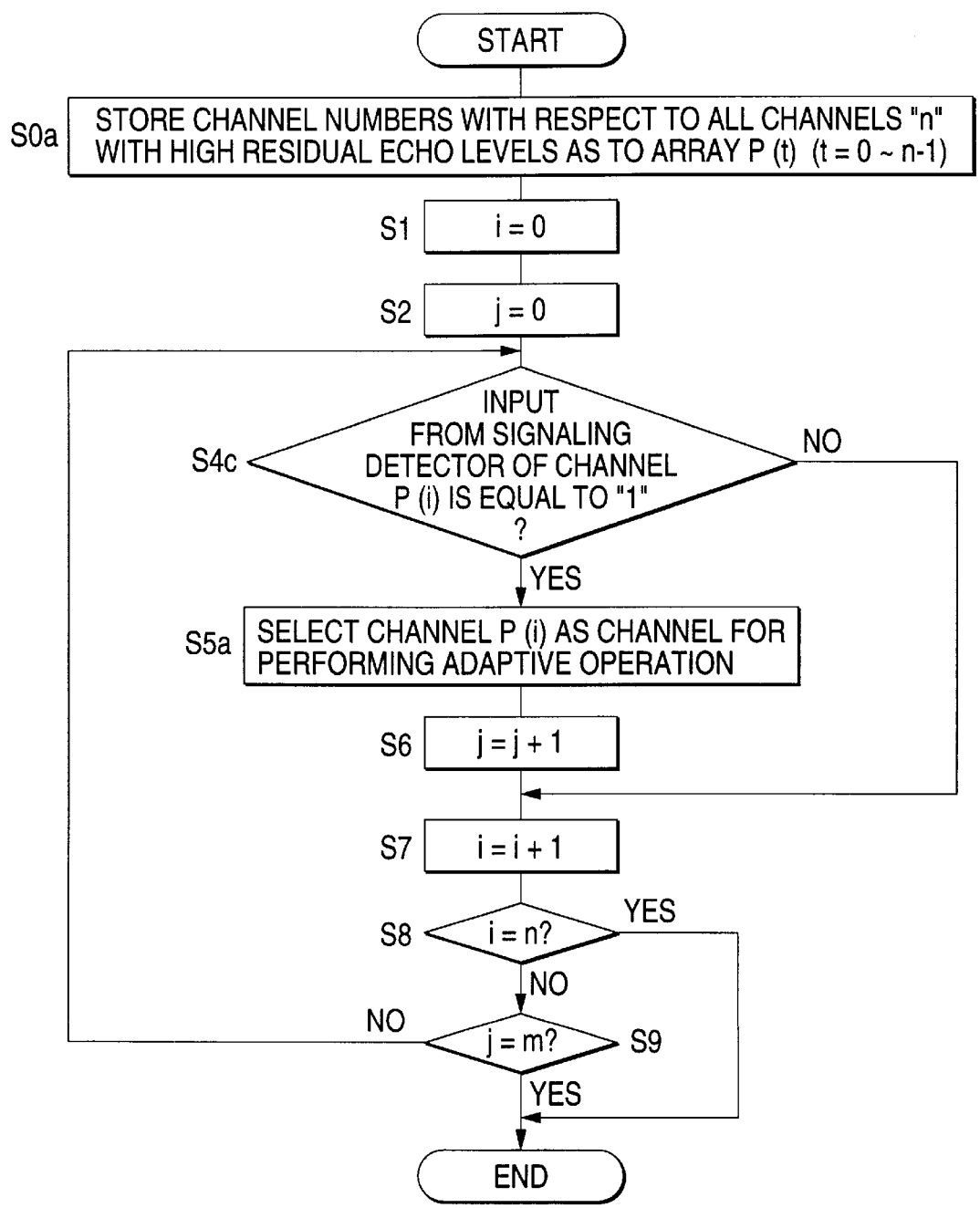
FIG. 20 is a flowchart for explanation of the function of an adaptive operation control unit shown in FIG. 19.
Figure 21:
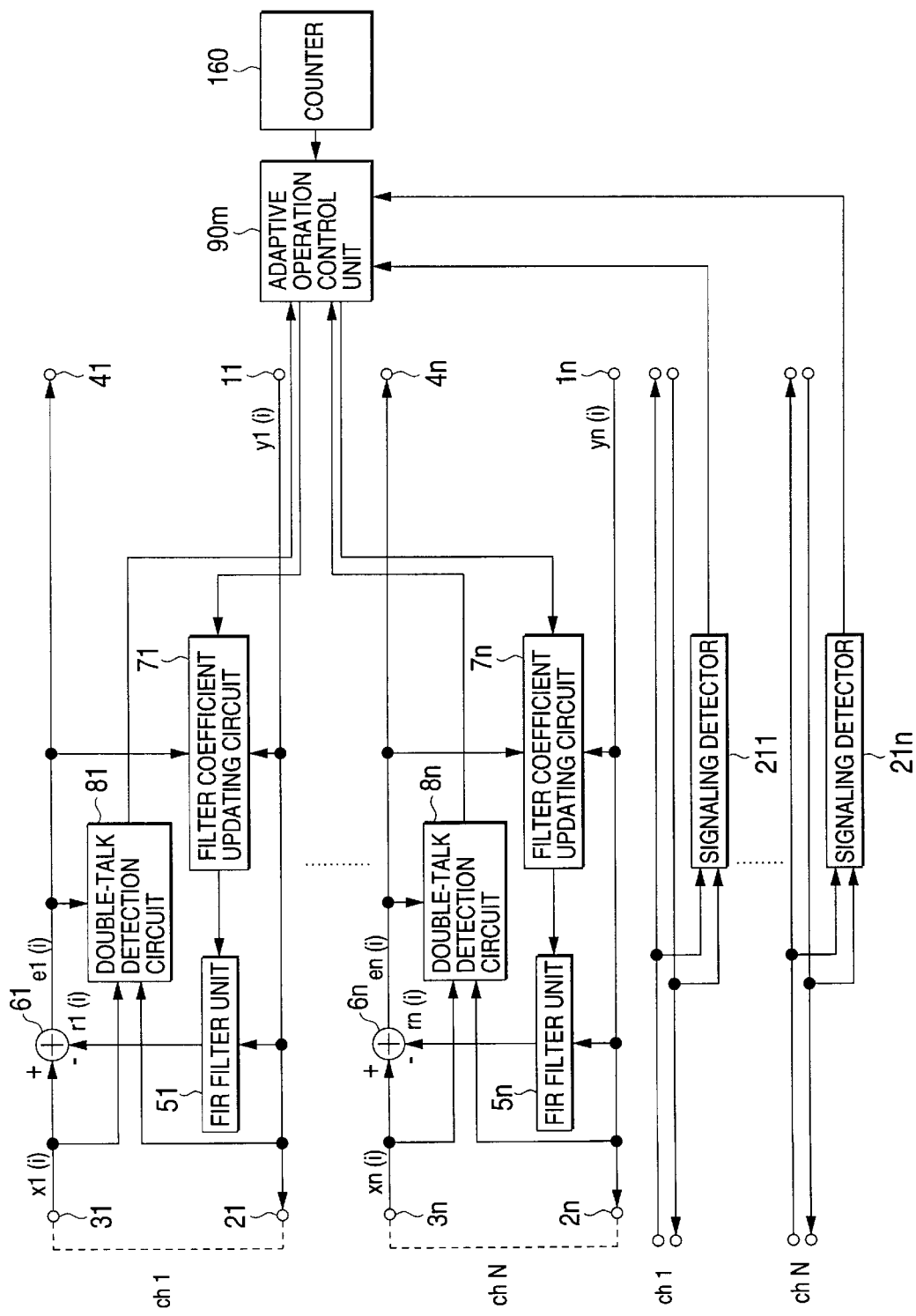
FIG. 21 is a functional block diagram showing an echo canceller in accordance with another embodiment of the present invention.

The adaptive operation control units 90j/90k, as shown in FIGS. 18 and 20, first conduct the same operation as that of the steps s0 to s2 in FIG. 10 and the steps s0a/s1/s2 in FIG. 12 (steps s0 to s2 in FIG. 18, and steps s0a, s1 and s2 in FIG. 20). Then, the adaptive operation control units 90j/90k input the state signal of "1" or "0" from the signal detectors 211 to 21n for judging whether the #p(0) channel that is selected as a candidate channel in which the adaptive operation is done is in busy state, or not, and select the channel as a channel in which the adaptive operation is done when the state signal from the signaling detector of the #P(0) channel is "1", but do not select the channel when it is "0" (steps s4c and s5a in FIGS. 18 and 20). Further, the adaptive operation control units 90j/90k conduct the same operation as that of the steps s6 to s9 in FIGS. 10 and 12 (steps s6 to s9 in FIGS. 18 and 20).

Figure 22:
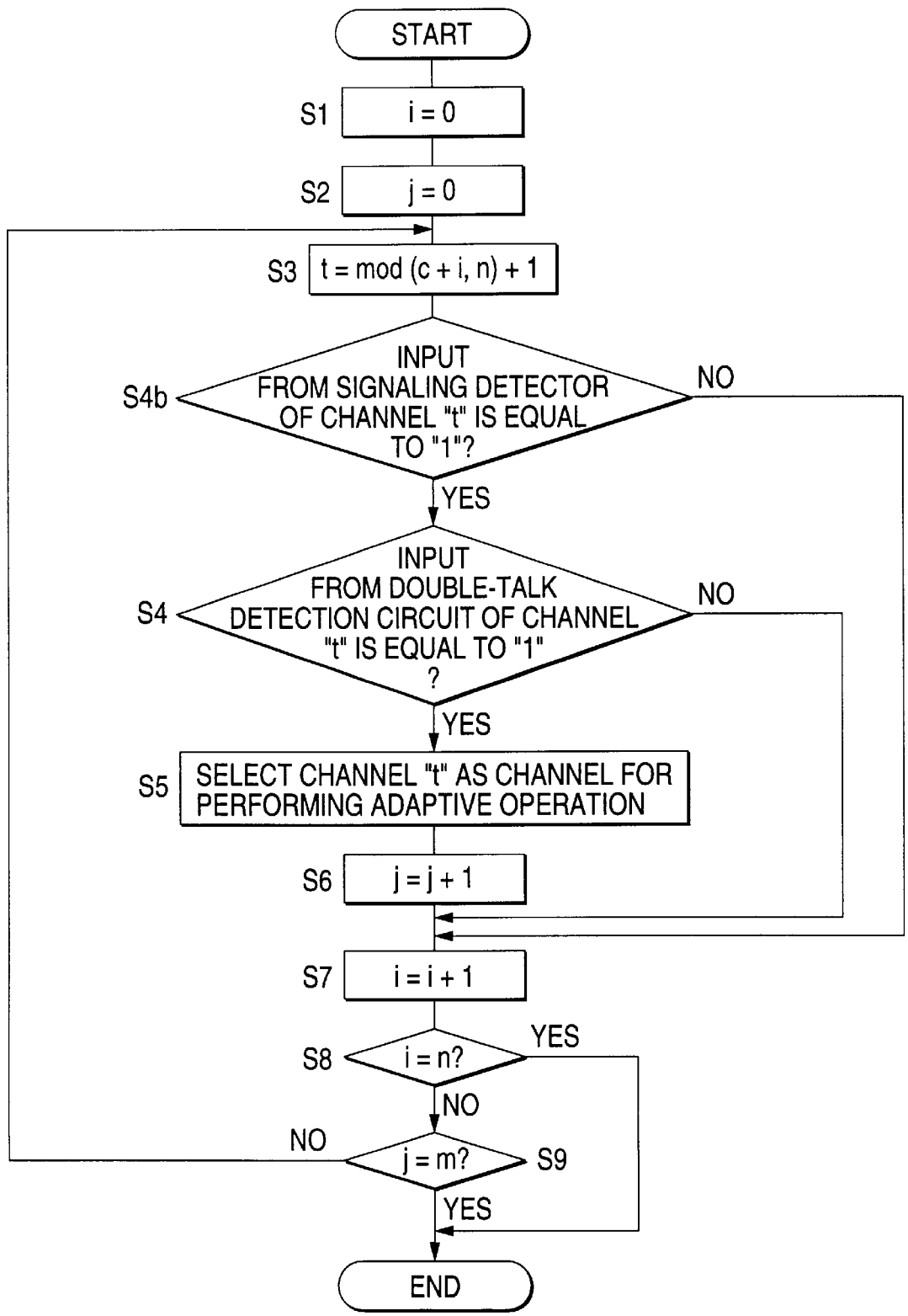
FIG. 22 is a flowchart for explanation of the function of an adaptive operation control unit shown in FIG. 21.
Figure 23:
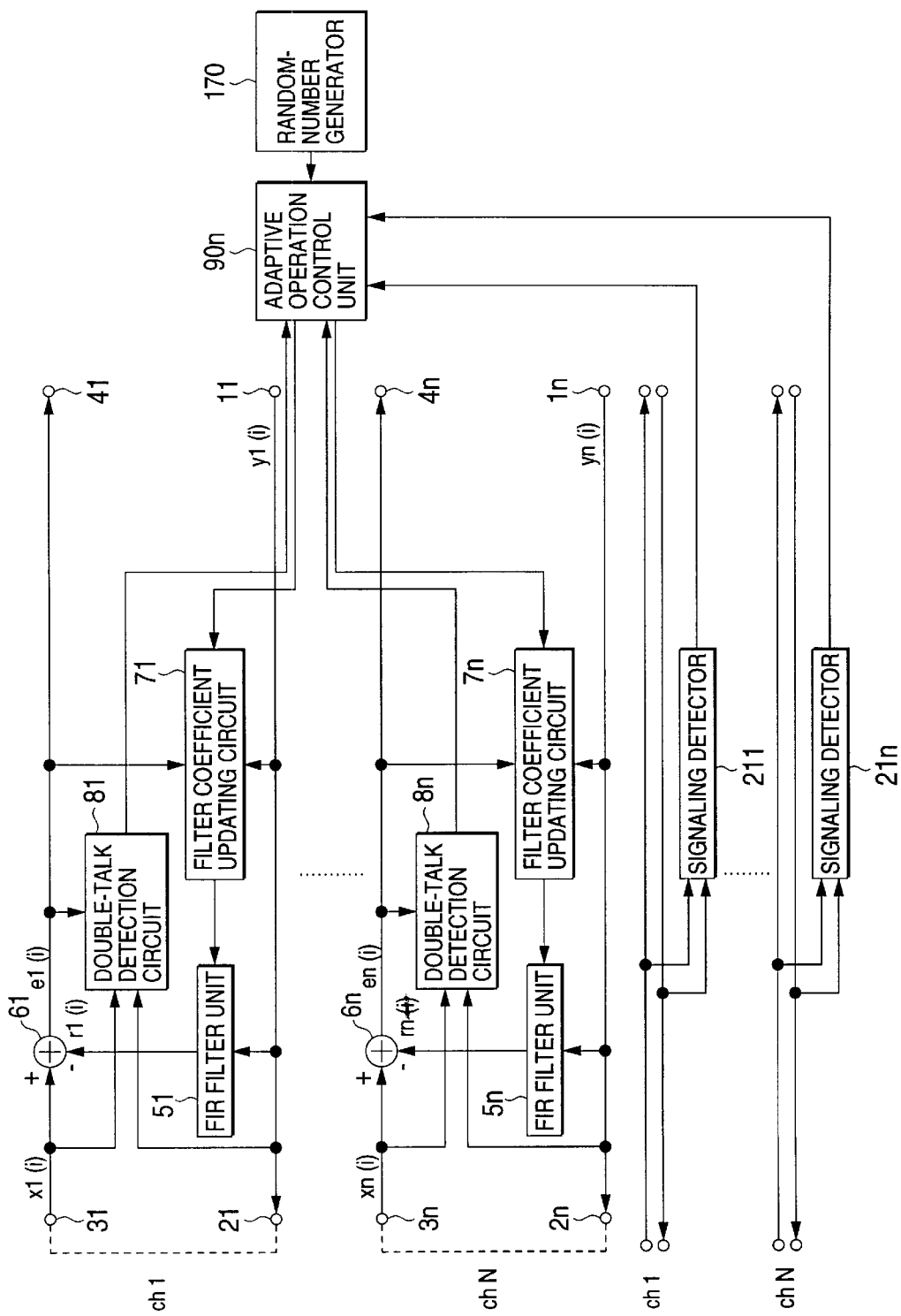
FIG. 23 is a functional block diagram showing an echo canceller in accordance with another embodiment of the present invention.
Figure 24:
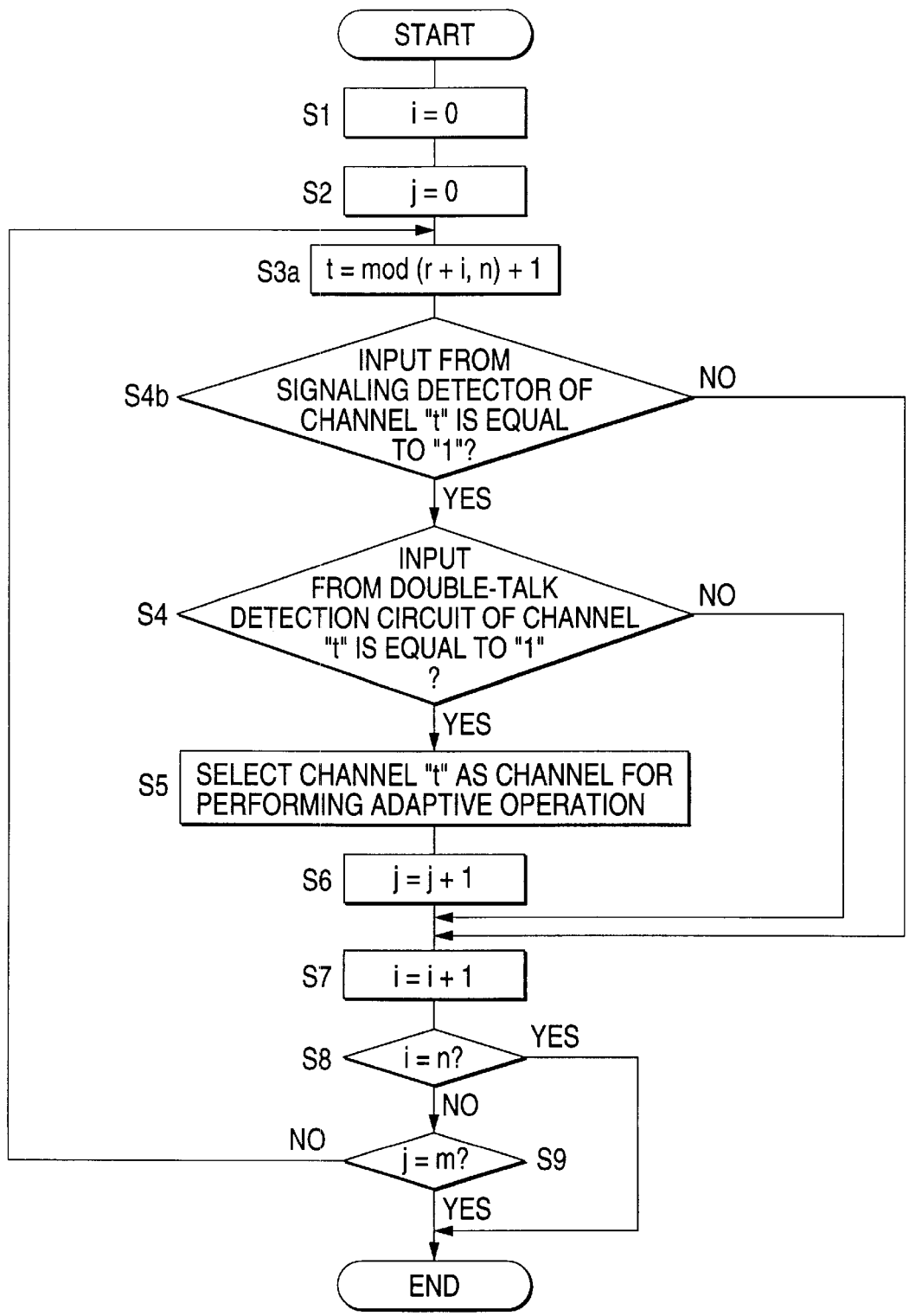
FIG. 24 is a flowchart for explanation of the function of an adaptive operation control unit shown in FIG. 23.
Figure 25:
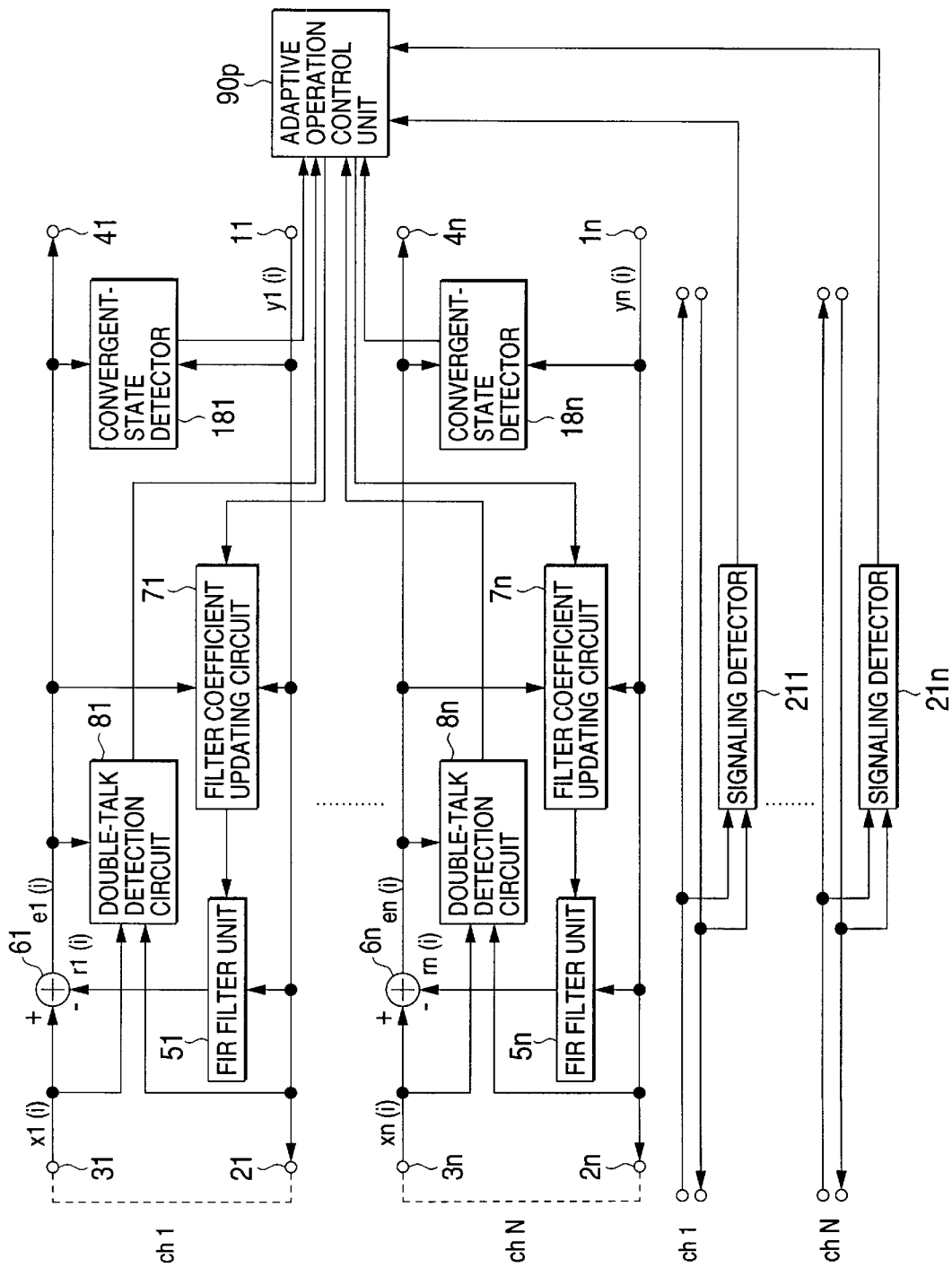
FIG. 25 is a functional block diagram showing an echo canceller in accordance with another embodiment of the present invention.

The adaptive operation control units 90m/90n, as shown in FIGS. 22 and 24, first conduct the same operation as that of the steps s1 to s3 in FIG. 14 and the steps s1/s2/s3a in FIG. 16 (steps s1 to s3 in FIG. 22, and steps s1, s2 and s3a in FIG. 24). Then, they input the state signal of "1" or "0" from the signaling detectors 211 to 21n for judging whether the #t channel selected as a candidate channel in which the adaptive operation is done is in busy state, or not, and also input the detection signal of "0" or "1" from the double talk detection circuits 81 to 8n for judging whether it is in a double-talk state or a silent state. Then, they select the channel as a channel in which the adaptive operation is done when both of the state signal and the detection signal are "1", but do not select the channel when any one of them is "0" (steps s4b, s4 and s5 in FIGS. 22 and 24). Further, they conduct the same operation as the steps s6 to s9 in FIGS. 14 and 16 (the steps s6 to s9 in FIGS. 22 and 24).

Figure 26:
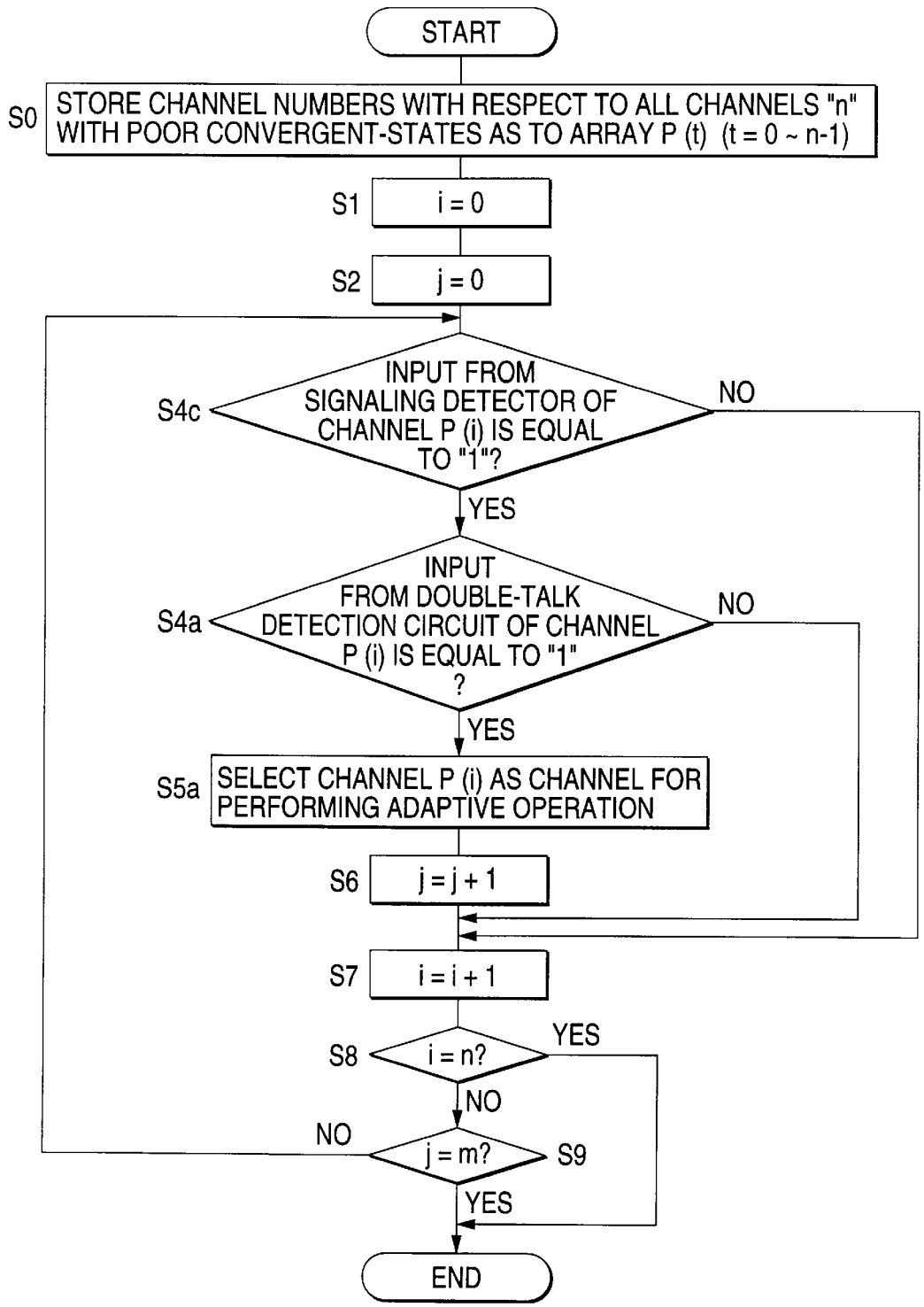
FIG. 26 is a flowchart for explanation of the function of an adaptive operation control unit shown in FIG. 25.
Figure 27:
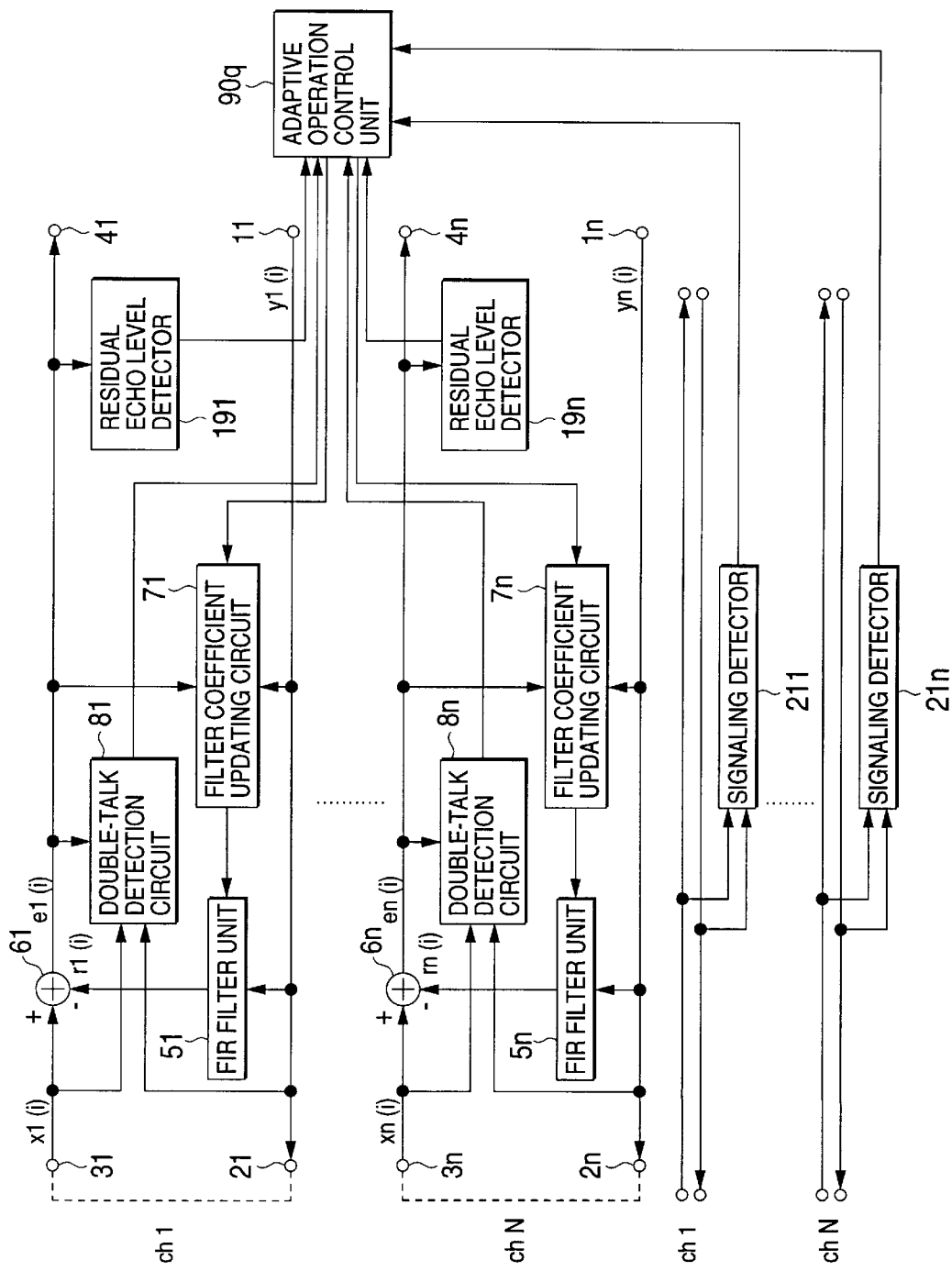
FIG. 27 is a functional block diagram showing an echo canceller in accordance with another embodiment of the present invention.
Figure 28:
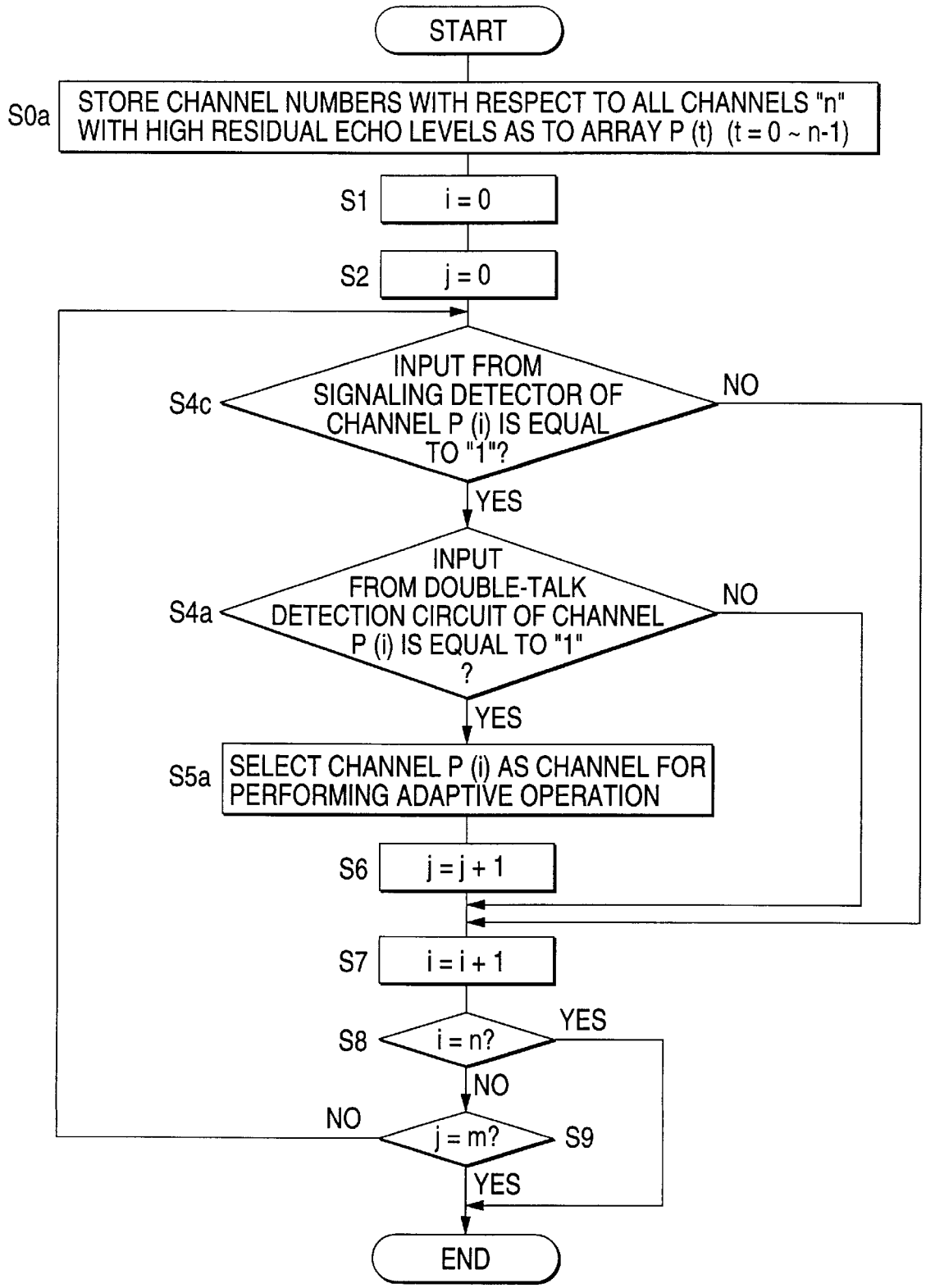
FIG. 28 is a flowchart for explanation of the function of an adaptive operation control unit shown in FIG. 27.

The adaptive operation control units 90p/90q, as shown in FIGS. 26 and 28, first conduct the same operation as that of the steps s0 to s2 in FIG. 18 and the steps s0a/s1/s2 in FIG. 20 (steps s0 to s2 in FIG. 26, and steps s0a, s1 and s2 in FIG. 28). Then, the adaptive operation control units 90p/90q input the state signal of "1" or "0" from the signal detectors 211 to 21n for judging whether the #p(0) channel selected as a candidate channel in which the adaptive operation is done is in busy state, or not, and also input the detection signal of "0" or "1" from the double-talk detection circuits 81 to 8n for judging whether it is in the double-talk state or in the silent state. Then, they select the channel as a channel in which the adaptive operation is done when both of the state and detection signals are "1", but do not select the channels when any one of them is "0" (steps s4c, s4a and s5a in FIGS. 26 and 28). Further, the adaptive operation control units 90p/90q conduct the same operation as that of the steps s6 to s9 in FIGS. 18 and 20 (steps s6 to s9 in FIGS. 26 and 28).

In the above embodiments of the present invention shown in FIGS. 1–5, 7, 9, 11, 13, 15, 17, 19, 21, 23, 25 and 27, the FIR filter section 5z (z=1 to n), as shown in FIG. 29, may be made up of receive signal registers 51z0 to 51zb and filter coefficient registers 52z0 to 52zb, the convolution calculators 53z0 to 53zb, coefficient power calculators 54z0 to 54zb, which are constituted by a plurality of blocks, and an FIR filter unit 5za having a block selecting section 55z and an adder 56z which are common to the respective blocks. The filter operation processing load of the channel in which the adaptive processing complexity is not done can be reduced to s/(b+1) (s is an integral number smaller than the number of blocks (b+1)).

The k-th receive signal register 51zk stores receive signals yz(i−j * k), yz(i−j * k−1), . . . , yz(i−j * (k+1)+1) of j samples, which is the quotient obtained by dividing the total number h of the stored receive signal samples by the number (b+1) of blocks from the receive signal input terminal 1z (z=1 to n) at a sampling time i.

The k-th filter coefficient register 52zk stores filter coefficients $az_{jk}(i)$, $az_{jk+1}(i)$, . . . , $az_{j(k+1)-1}(i)$ of the j samples which are the same as the number of samples stored in the receive signal register 51zk at the sampling time i.

The k-th convolution calculator unit 53zk calculates the convolution Sk(i) of the storage values of the k-th receive signal register and filter coefficient register as shown in the following equation and output Sk(i) when the control signal from the block selecting section 55z is "1", and does not calculate the convolution and output 0 when it is "0" to an adder 56Z respectively.

$$S_k(i) = \Sigma_u az_u(i) * yz(i-u),$$

u=j * k to j * (k+1)−1

The k-th coefficient power calculation unit 54zk outputs calculates the power (for example, sum of squares) of storage value of the k-th filter coefficient register 52zk as shown in the following equation to output its calculation result $P(a_k(i))$ to the block selecting section 55z.

$$P(a_k(i)) = \Sigma_u \{az_u(i)\}^2,$$

u=j * k to j * (k+1)−1

The block selecting section 55z output "1" to all of the convolution calculators 53z0 to 53zb when the filter coefficient updating operation is conducted, "1" to the respective s convolution calculators of from the largest block to the s-th (s is an integral number smaller than the number (b+1) of blocks) larger block among the coefficient power calculation results $P(a_0(i))$, $P(a_1(i))$, . . . , $P(a_b(i))$ from all the coefficient power calculation units 54z0 to 54zb, and "0" to the convolution calculator of blocks other than the above blocks when the filter updating operation is not conducted, in accordance with a control signal from an AND circuit 15z (z=1 to n) or adaptive operation control units 90/90a to 90q.

The adder 56z calculates the total sum $S_0(i)+S_1(i)+\ldots+S_b(i)$ of the convolution results from all the convolution calculators 53z0 to 53zb to output the total sum to a subtractor 6z (z=1 to n).

The FIR filter unit 5za in the above embodiment outputs "1" to all the convolution calculators 53z0 to 52zb from a block selecting section 55z at a sampling time at which the filter coefficient updating operation is conducted. Hence, the total sum rz(i) calculated by the adder 56z is the same as the echo replica produced by the FIR filter unit 5z of the above-mentioned prior art, as follows.

$$rz(i) = S_0(i) + S_1(i) + \ldots + S_b(i)$$
$$= \Sigma_u az_u(i) * yz(i-u) + \Sigma_{u1} az_{u1}(i) * yz(i-u1) + \ldots + \Sigma_{u2} az_{u2}(i) * yz(i-u2)$$
$$= \Sigma_{u3} az_{u3}(i) * yz(i-u3)$$
$$= \Sigma_k az_k(i) \times yz(i-k)$$

where u=0 to j−1, u1=j to 2j−1, u2=b * j to (b+1) * j−1, u3=0 to (b+1) * j−1, and k=0 to h−1.

On the other hand, the present invention is not limited to the example in which "1" is outputted to all the blocks from the block selecting section 55z at the sampling time at which no filter coefficient updating operation is conducted. In this example, it is assumed that "0" is outputted to the blocks 0 and 1 whereas "1" is outputted to other blocks. Then, the outputs of the convolution calculators 53z0 to 53z1 become "0", and the outputs of other convolution calculators 53z2 to 53zb become $S_k(i)$. It should be noted that the values of the block coefficients $az_0(i)$ to $az_{2j-1}(i)$ which are not used for calculating the convolution are smaller than other block coefficients, and therefore, if the convolution operations are done in the blocks 0 and 1, the convolution results are smaller than those of the other blocks. Therefore, the total sum rz(i) is substantially the same as the result of conducting convolution over all the blocks, thus not influencing the echo canceling performance.

As was described above, since the echo canceller of the present invention is of the multi-channel echo canceling system in which the adaptive operation of each channel is controlled impartially to cancel echoes from a plurality of channels, the echo canceling performance of each channel is equivalent to those of the other channels, and the processing complexity is reduced, thereby being capable of obtaining the echo canceller for multi-channel processing, in comparison with the conventional systems, that is, the multi-channel echo canceling system that cancels echo independently in each channel, the multi-channel echo canceling system that estimates a plurality of echo paths through adaptive filter operation where the respective channels are not independent from each other to cancel the echo, and the multi-channel echo canceling system that limits to m-channels in which the adaptive filter operation are done among all n-channels (m is an integral number smaller than n) to cancel the echo.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An echo cancellor for multi-channel processing, comprising:

a plurality of channels each of which includes a subtractor for subtracting an echo replica supplied by a finite length impulse response (FIR) filter unit from a transmission signal supplied by a transmission-signal input terminal to output a residual signal to a transmission-signal output terminal;

said plurality of FIR filter units storing filter coefficients which are estimated impulse responses of echo paths and receive signals from a plurality of receive-signal input terminals to produce the echo replicas by performing convolution of the filter coefficients and the receive signals;

each of said channels further including a double-talk detection circuit for monitoring powers of the transmission signal and the receive signal from a corresponding one of said transmission and receive signal input terminals and a residual signal from a corresponding one of said subtractors to detect double-talk presence and absence thereof and to output a detection signal;

each of said channels further including a filter coefficient updating circuit for updating the filter coefficients stored in a corresponding one of said FIR filter units according to a control signal;

a sequence generator generating a sequence signal;

an adaptive-operation control unit for selecting said channels in accordance with the sequence signal from said sequence generator and on the basis of a limitation result to output a selection signal;

a plurality of AND circuits each of said AND circuits outputting the control signal produced by a logical AND of the detection signal from a corresponding one of said double-talk detection circuits and the selection signal to a corresponding one of said plurality of filter coefficient updating circuits.

2. The echo canceller as claimed in claim 1, wherein said sequence generator is a random-number generator for generating a random number as the sequence signal every time period.

3. The echo canceller as claimed in claim 1, wherein said sequence generator includes a plurality of convergent-state-detection units for estimating an echo attenuation amount as the sequence signal for each of said channels from a power ratio of the receive signal from the plurality of receive signal input terminals to the residual signal from the plurality of subtractors.

4. The echo canceller as claimed in claim 1, wherein said sequence generator includes a plurality of residual echo level estimation units for estimating a residual echo level as the sequence signal for each of said channels from a power of the residual signal from the plurality of subtractors.

5. The echo canceller as claimed in claim 1, wherein said AND circuits are not included in said channels and said double-talk detection circuits are connected to said adaptive operation control unit;

said adaptive-operation control unit giving a priority to at least one of said channels which is not in a double-talk presence state by generating the control signal and sending the control signal to said filter coefficient update circuit having the priority.

6. The echo canceller as claimed in claim 1, each of said channels further including a signaling detection unit for monitoring the signaling state of the corresponding channel to judge whether the corresponding channel is in a busy state and outputting a busy state signal to said adaptive-operation control unit, wherein said adaptive-operation control unit gives priority to busy channels based on the busy state signals.

7. The echo cancellor as claimed in claim 1, each of said FIR filter units further including:

plural blocks of receive-signal registers for storing receive signals of a predetermined number of samples from said receive-signal input terminals at respective sampling times;

plural blocks of filter coefficient registers for sequentially updating and storing filter coefficients at the respective sampling times according to control signals from said plurality of filter coefficient updating circuits;

plural blocks of convolution calculators for subjecting the respective stored receive signals from said receive-signal registers and filter coefficients from said filter coefficient registers to perform convolution according to a second control signal;

a channel block selecting section for outputting the second control signal;

plural blocks of coefficient power calculation units for subjecting said filter coefficient values to a coefficient power operation each time period to output a coefficient power operation result;

said channel block selecting section outputting said second control signal according to the control signal from a corresponding one of said AND circuits and coefficient power results of said plural blocks of coefficient power calculation units; and a channel adder for outputting a sum of the results of convolution from said plural blocks of convolution calculators to said plurality of subtractors.

8. The echo canceller as claimed in claim 1, wherein said sequence generator is a counter incrementing the sequence signal every time period in a circular fashion within a range of 1 to the number of said channels.

9. The echo canceller as claimed in claim 5, wherein said sequence generator is a random-number generator for generating a random number as the sequence signal every time period.

10. The echo canceller as claimed in claim 5, wherein said sequence generator is a counter incrementing the sequence signal every time period in a circular fashion within a range of 1 to the number of said channels.

11. The echo canceller as claimed in claim 5, wherein said sequence generator includes a plurality of convergent-state-detection units for estimating an echo attenuation amount as the sequence signal for each of said channels from a power ratio of the receive signal from the plurality of receive signal input terminals to the residual signal from the plurality of subtractors.

12. The echo canceller as claimed in claim 5, wherein said sequence generator includes a plurality of residual echo level estimation units for estimating a residual echo level as the sequence signal for each of said channels from a power of the residual signal from the plurality of subtractors.

13. The echo canceller as claimed in claim 6, wherein said sequence generator is a random-number generator for generating a random number as the sequence signal every time period.

14. The echo canceller as claimed in claim 6, wherein said sequence generator is a counter incrementing the sequence signal every time period in a circular fashion within a range of 1 to the number of said channels.

15. The echo canceller as claimed in claim 6, wherein said sequence generator includes a plurality of convergent-state-detection units for estimating an echo attenuation amount as the sequence signal for each of said channels from a power ratio of the receive signal from the plurality of receive signal input terminals to the residual signal from the plurality of subtractors.

16. The echo canceller as claimed in claim 6, wherein said sequence generator includes a plurality of residual echo level estimation units for estimating a residual echo level as the sequence signal for each of said channels from a power of the residual signal from the plurality of subtractors.

17. The echo canceller as claimed in claim 5, each of said channels further including a signaling detection unit for monitoring the signaling state of the corresponding channel to judge whether the corresponding channel is in a busy state and outputting a busy state signal to said adaptive-operation control unit, wherein said adaptive-operation control unit gives priority to busy channels based on the busy state signals.

18. The echo canceller as claimed in claim 17, wherein said sequence generator is a random-number generator for generating a random number as the sequence signal every time period.

19. The echo canceller as claimed in claim 17, wherein said sequence generator is a counter incrementing the sequence signal every time period in a circular fashion within a range of 1 to the number of said channels.

20. The echo canceller as claimed in claim 17, wherein said sequence generator includes a plurality of convergent-state-detection units for estimating an echo attenuation amount as the sequence signal for each of said channels from a power ratio of the receive signal from the plurality of receive signal input terminals to the residual signal from the plurality of subtractors.

21. The echo canceller as claimed in claim 17, wherein said sequence generator includes a plurality of residual echo level estimation units for estimating a residual echo level as the sequence signal for each of said channels from a power of the residual signal from the plurality of subtractors.

* * * * *